(12) United States Patent
Sekiguchi

(10) Patent No.: US 7,379,426 B2
(45) Date of Patent: May 27, 2008

(54) ROUTING LOOP DETECTION PROGRAM AND ROUTING LOOP DETECTION METHOD

(75) Inventor: Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 826 days.

(21) Appl. No.: 10/785,032

(22) Filed: Feb. 25, 2004

(65) Prior Publication Data
US 2005/0063311 A1  Mar. 24, 2005

(30) Foreign Application Priority Data
Sep. 18, 2003  (JP) ............... 2003-326173

(51) Int. Cl.
*H04L 12/28* (2006.01)
(52) U.S. Cl. ................... 370/241; 370/254
(58) Field of Classification Search ............. None
See application file for complete search history.

(56) References Cited

U.S. PATENT DOCUMENTS

| | | | |
|---|---|---|---|
| 6,298,456 B1* | 10/2001 | O'Neil et al. ............ | 714/48 |
| 7,120,145 B2* | 10/2006 | Ohba et al. ............ | 370/389 |
| 2003/0149764 A1* | 8/2003 | Beaulieu ............ | 709/224 |
| 2003/0217141 A1* | 11/2003 | Suzuki et al. ............ | 709/224 |
| 2003/0225908 A1* | 12/2003 | Srinivasan et al. ........ | 709/243 |

OTHER PUBLICATIONS

Urs Hengartner et al. "Detection and Analysis of Routing Loops in Packet Traces", Sprint ATL Technical TR02-ATL-051001, May 2002.
Craig Labovitz et al., "Delayed Internet Routing Convergence"; Copyright 2000 ACM 1-58113-224-7/00/0008, pp. 175-187.

\* cited by examiner

*Primary Examiner*—Brian Nguyen
(74) *Attorney, Agent, or Firm*—Staas & Halsey LLP

(57) ABSTRACT

A routing loop detection program that controls a computer to be operated as equipment including a counter that counts the number of packets whose IP header includes the hop number for each of all the possible hop numbers when a packet capture device connected to a network acquires all packets captured within a predetermined period, a discriminator that discriminates whether a flat portion or a sawtooth portion exists in a histogram based on the number of packets for the respective hop numbers counted by the counter, and an output portion that notifies a sign of occurrence of routing loop when the discriminator discriminated that the histogram has the flat portion or the sawtooth portion.

10 Claims, 12 Drawing Sheets

ROUTING LOOP DETECTION PROGRAM AND ROUTING LOOP DETECTION METHOD

BACKGROUND OF THE INVENTION

1. Field of the Invention

The present invention relates to a routing loop detection program that controls a computer to be operated as equipment for detecting routing loop and to routing loop detection method realized by a computer on which such a routing loop detection program is running.

2. Prior Art

As well known, IP (Internet Protocol) contained in TCP/IP (Transmission Control Protocol/Internet Protocol) suite is widely used as a Network layer protocol in the Internet, intranets, etc.

At least one IP address is given to the computer that has a communication function according to IP for individually identifying the computer from other computers.

When this kind of computer transmits data in the Network layer in the OSI (Open System Interconnection) reference model, the computer divides transmitting data into small data blocks called "packet" (it is also called "datagram") in which a source IP address, a destination IP address and other information are included as a header information, and transmit the packet to a computer of the destination.

In general, this kind of computers are not directly connected to each other, they are connected through a plurality of computers that relay a packet specially. The relay specialty computer is called a router. IP addresses are also given to these routers, respectively.

Each router has a routing table that associates a destination IP address of a packet with IP addresses of other routers or computers that relay the packet. Receiving a packet from other routers or computers, the router selects the next router or computer to which the packet is transmitted and transmits the packet. Consequently, a packet is sent from the source computer to the destination computer through some routers in sequence.

Moreover, when a router receives a packet from another router or computer, the router decrements the residual hop number recorded on the predetermined field (a lifetime field in the IP version 4, a hop limit field in the IP version 6) of the IP header of the packet by one, increments the value in a checksum field by one as a result of the checksum calculation only for the IP version 4, and transmits the packet to the next router or computer. Furthermore, each router also discards packets whose residual hop number becomes zero and informs discard of the packet to the computer of the source IP address according to ICMP (Internet Control Message Protocol).

In general, the network that can perform packet communication according to IP in the Network layer by such a router and a computer is called an IP network.

Incidentally, routing loop is one of the network troubles caused in the IP network. The routing loop is a phenomenon in which a packet repeatedly travels among some routers and does not reach the destination.

In many cases, the routing loop is caused by various setup errors, troubles of hardware such as a router or other troubles. However, if the routing loop occurred in the predetermined router group is caused by the setting error of a router located outside the management area of the administrator who manages the router group, the administrator cannot resolve the routing loop because the administrator cannot check and change the setting of the router located outside the management area.

Then, it becomes important to quickly discover the router group that causes the routing loop in order to suppress the damage to the administrator suffering from the routing loop.

Conventionally, the following three methods were known to discover such routing loop.

The first method uses the routing table. That is, the first method finds out combinations of entry records that form loops one after another by checking the routing tables of all routers in the management area. An advantage of the first method is that a combination of routers forming a loop can be certainly detected.

The second method uses a traceroute. That is, the second method makes a computer having traceroute function connect to a router in the management area and makes the computer sequentially transmit investigating packets whose residual hop numbers are different one by one to another computer in the management area. If packets with time-exceeded message (the ICMP header whose type field is "11" is added to the IP header) are repeatedly received from the same router group located on the path to the destination address, the second method judges that routing loop occurs in that router group. An advantage of the second method is that routing loop caused in any path within the management area can be detected.

The third method uses a packet capture. That is, the third method inserts a computer that has a packet capturing function among the routers in the management area to supervise all the packets that pass through the routers. See "Routing Loop Detection" on page 3 of chapter 4 of "Detection and Analysis of Routing Loops in Packet Traces" by Urs Hengartner, Sue Moon, Richard Mortier, and Christophe Diot, whose URL is "http://www-2.cs.cmu.edu/People/uhengart/imw02.pdf" that could be browsed on Jun. 9, 2003.

According to the third method, the computer extracts packets whose contents are identical with the exception of the residual hop number (and checksum value in the case of the IP version 4) in the IP header. When the residual hop numbers (and the checksum number) of the extracted packets vary in arithmetic series, the computer judges that routing loop is caused. An advantage of the third method is that routing loop can be immediately detected.

However, since the first method requires the manual work for checking the combinations of the entry records, it takes much time to find the routing loop. Moreover, since the usual routing table includes many entry numbers (100 pieces, for example), the time and effort for finding routing loop increase as the number of the routers in the management area increases. Therefore, the first method lacks immediacy and scale extendibility.

Further, the second method mentioned above may not detect routing loop in the following case. Some mistakes in a routing table may occur the phenomenon where only the packet from a certain source IP address causes routing loop and the other packets do not cause routing loop. In such a case, routing loop may not be detected by the second method, even if investigating packets are supplied to the path. Moreover, since the second method requires a great number of investigating packets, the load given to the network traffic becomes greater as the investigation period becomes shorter. The load may cause a new network trouble. Therefore, the second method lacks certainty and immediacy.

Furthermore, although the third method can detect routing loop caused between the routers that straddle the packet capture, it cannot detect routing loop caused between the routers that do not straddle the packet capture. When the communication speed between routers increases, the number of packets that is acquired by the packet capture becomes too large to be caught up by the computer, which interferes with the application of the computer to large-scale and high-speed management area like iDC (internet Data Center) or ISP (Internet Service Provider). Therefore, the third method lacks certainty and scale extendibility.

SUMMARY OF THE INVENTION

It is therefore an object of the present invention to provide an improved routing loop detection program, which is capable of controlling a computer to be operated as equipment for detecting routing loop certainly and immediately in spite of the scale of the network. Another object of the present invention is to provide an improved routing detection method realized by a computer on which such a routing loop detection program is running.

For the above object, the routing loop detection program according to a first aspect of the present invention controls a computer to be operated as equipment including:

a counter that counts the number of packets whose IP header includes the hop number for each of all the possible hop numbers when a packet capture device connected to a network acquires all packets captured within a predetermined period;

a discriminator that discriminates whether a flat portion or a sawtooth portion exists in a histogram based on the number of packets for the respective hop numbers counted by the counter; and an output portion that notifies a sign of occurrence of routing loop when the discriminator discriminated that the histogram has the flat portion or the sawtooth portion.

Further, for the above object, the routing loop detection program according to a second aspect of the present invention controls a computer to be operated as equipment including:

a extracting portion that extracts the packets with a time-exceeded message from all packets captured by a packet capture device connected to a network;

a reading portion that reads destination IP addresses of the discarded packets from the time-exceeded messages of the packets extracted by the extracting portion;

a transmitting portion that transmits an investigating packets to the destination IP address read by the reading portion through a communication device connected to the network;

a receiving portion that receives a packet in response to the investigating packet transmitted by the transmitting portion through the communication device; and an output portion that notifies occurrence of routing loop when the packet received by the receiving portion has a time-exceeded message.

First and second computers on which the routing loop detection programs of the first and second aspects are running, respectively, are located on a network. The network is provided with at least two routers and a packet capture device located on every path among the routers. The first computer is arranged so that the first computer supervises packets captured by each packet capture device. The second computer is arranged so that the second computer supervises packets captured by the packet capture device located just behind a gateway router at the most upstream of the network.

With these constructions, there are the following effects.

Since the packet capture device is locate on every path among the routers, the first computer can certainly detect a sign of occurrence of routing loop even if routing loop occurs in any path between the routers. Further, even if the mistake in a routing table occurs the phenomenon where only the packet from a certain source IP address causes routing loop and the other packets do not cause routing loop, the first computer can certainly detect a sign of occurrence of routing loop.

Since the first computer acquires only the residual hop number from the captured packet and counts frequencies of the respective hop numbers, the first computer can execute the demanded process even in a large-scale network with high-speed communication among routers. Therefore, the first computer can detect a sign of occurrence of routing loop among routers certainly and immediately in spite of the scale of the network.

In addition, the signs of occurrence of routing loop detected by the first computer includes a sign caused by an intentional operation such as traceroute or attack and a sign caused by a network trouble that is not intentional operation. However, the first computer cannot distinguish whether the sign is intentional or not. When the first computer detects the sign of the occurrence of the routing loop, the second computer receives a notification of the IP address of the router corresponding to the packet capture device that detects the sign. The notification triggers the second computer to investigate the occurrence of routing loop on the path including the router that is a source of routing loop.

The second computer supervises the packets with the time-exceeded messages directed to the outer network from the packets passing through the gateway router after the second computer starts the investigation. When the second computer acquires the packet with a time-exceeded message, which is created when the original packet is discarded, directed to the outer network, the second computer reads the destination IP address to which the discarded original packet should be delivered based on the time-exceeded message. Then, the second computer transmits the investigating packet to the destination IP address. After that, the second computer checks whether a packet with a time-exceeded message is received in response to the investigating packet or not. When the second computer receives the packet with the time-exceeded message, the second computer can check whether the source IP address of the packet is coincident with the IP address of the router that is informed by the first computer.

The second computer acquires only the packet with the time-exceeded message selected from the packets passing through the path just behind the gateway router. While the packet with the time-exceeded message is created by the traceroute or attack in addition to the routing loop, its rate is a few percent of all packets in a large-scale network. Further, the second computer does not check whether the contents of the packets are identical or not one by one unlike the above-described third method. Therefore, since the second computer is required to perform only easy processing about the selected packets, it can certainly acquire and process a packet with a time-exceeded message even on a path just behind a gateway router of a large-scale network through which a huge number of packets pass.

Further, the second computer transmits the investigating packet only when it acquired a packet with a time-exceeded message, which does not apply the load without reference to the scale of the network. Still further, the second computer acquires a packet with a time-exceeded message only when it has received the notification from the first computer. Accordingly, a load is hardly applied to the path just behind the gateway router.

As described above, according to the present invention, the histogram formed of frequencies for the respective hop numbers is supervised for every path connecting adjacent routers. When the sign of routing loop occurs in the histogram, the router of the source of the sign is detected by supervising a packet with a time-exceeded message and by transmitting an investigating packet. Therefore, the routing loop can be certainly detected.

Further, according to the present invention, since the first computer acquires the hop numbers only from captured packets and the second computer is good enough to supervise a packet with a time-exceeded message, the first and second computers can execute the processes immediately even if they are used in a large-scale network. Therefore, the routing loop can be immediately detected without reference to the scale of the network.

In the present invention, the investigating packet may be a service request packet for a network application service on the application layer or a packet including an echo request message.

In the case of the service request packet as the former case, the value of the port number field in the layer 4 header in the segment to which IP header is added should be coincident with the port number of the network application service executed on the destination node of the investigating packet. This prevents the investigating packet from being discarded on the path by the packet filtering when the packet filtering is performed on the path to the node.

Further, in the present invention, the destination of the investigating packet is the destination IP address of the discarded packet that was read from the time-exceeded message. The protocol number of the investigating packet should be coincident with the protocol number of the discarded packet. In order to equate the protocol numbers, it is recommended that the protocol number is read from the time-exceeded message as well as the destination IP address. In such a manner, when the protocol number is dynamically assigned to the investigating packet, it becomes unnecessary to check the protocol number of the communication service under operating condition on each router on the path to the destination of the investigating packet.

Still further, in the present invention, the investigating packet may be dynamically created by a predetermined packet transmitting program or may be read from storage if necessary in which the investigating packet was previously stored. When the investigating packet is stored in the storage as the later case, invariant information for the investigation should have been already defined in the predetermined field in the investigating packet. In such a setting, when the investigating packet is necessary, it will be read from the storage and contents of its predetermined field will be updated by information required for the investigation. Such a reading and updating processes can be executed without starting the packet transmitting program, which reduces a load applied to the computer. Accordingly, the processing speed concerning the supervision of a time-exceeded message or transmission of an investigating packet increases as fast as possible.

Yet further, the present invention allows repeatedly transmitting an investigating packet to the node when the destination IP address read from a time-exceeded message indicates the node in the same subnet. On the contrary, it may stop transmitting the investigating packet until a lapse of predetermined time after the investigating packet is once transmitted to one node in the same subnet. With this method, even if routing loop, traceroute and attack generate a great number of packets with the same time-exceeded message, it is unnecessary to create investigating packets for every message. This reduces the number of investigations, which lightens the load on the network traffic.

Moreover, according to the present invention, when a packet with a time-exceeded message is acquired, an investigating packet may be transmitted to the node without reference to various conditions of the target node. On the contrary, a transmission of the investigating packet may be stopped in response to the various conditions of the target node. With this method, if the various conditions of a router that is recovering from routing loop and of a node on which a service indicated by the protocol number of the discarded packet is not operated are set in advance, it is not necessary to supply unnecessary investigating packets to the network, which lightens the load on the network traffic.

Further, the program of the present invention may control the computer, which received a packet with a time-exceeded message in response to the transmitted investigating packet, to find a router that causes routing loop and a path to the router by means of traceroute. With this program, a router that causes routing loop can be certainly specified.

Still further, for the above object, the routing loop detection method according to the first aspect of the present invention, which is executed by a computer, includes steps of:

counting the number of packets whose IP header includes the hop number for each of all the possible hop numbers when a packet capture device connected to a network acquires all packets captured within a predetermined period;

discriminating whether a flat portion or a sawtooth portion exists in a histogram based on the number of packets for the respective hop numbers counted; and notifying a sign of occurrence of routing loop when it is discriminated that the histogram has the flat portion or the sawtooth portion.

Yet further, for the above object, the routing loop detection method according to the second aspect of the present invention, which is executed by a computer, includes steps of:

extracting the packets with a time-exceeded message from all packets captured by a packet capture device connected to a network;

reading destination IP addresses of the discarded packets from the time-exceeded messages of the extracted packets;

transmitting an investigating packets to the destination IP address read at the reading step through a communication device connected to the network;

receiving a packet in response to the investigating packet transmitted through the communication device; and notifying occurrence of routing loop when the packet received has a time-exceeded message.

Therefore, the routing loop detection methods of the first and second aspects will be implemented via computers on which the routing loop detection programs of the first and second aspects of the present invention are running, respectively.

The present invention enables to detect routing loop certainly and immediately in spite of the scale of the network.

DESCRIPTION OF THE ACCOMPANYING DRAWINGS

DESCRIPTION OF THE PREFERRED EMBODIMENTS

The present invention is applied to a network that is operated by a certain management organization according to the same management policy. Such a network is called Autonomous System (AS). That is, the present invention is applied to a network managed by iDC (internet Data Center), a network managed by ISP (Internet Service Provider), an intranet, WAN (Wide Area Network), or LAN (Local Area Network) of a company or an academic institution, or the like. In the following embodiment, the present invention is applied to a network managed by iDC that provides communication lines and installation places of server systems by a so-called housing (or collocation) method.

Figure 1:
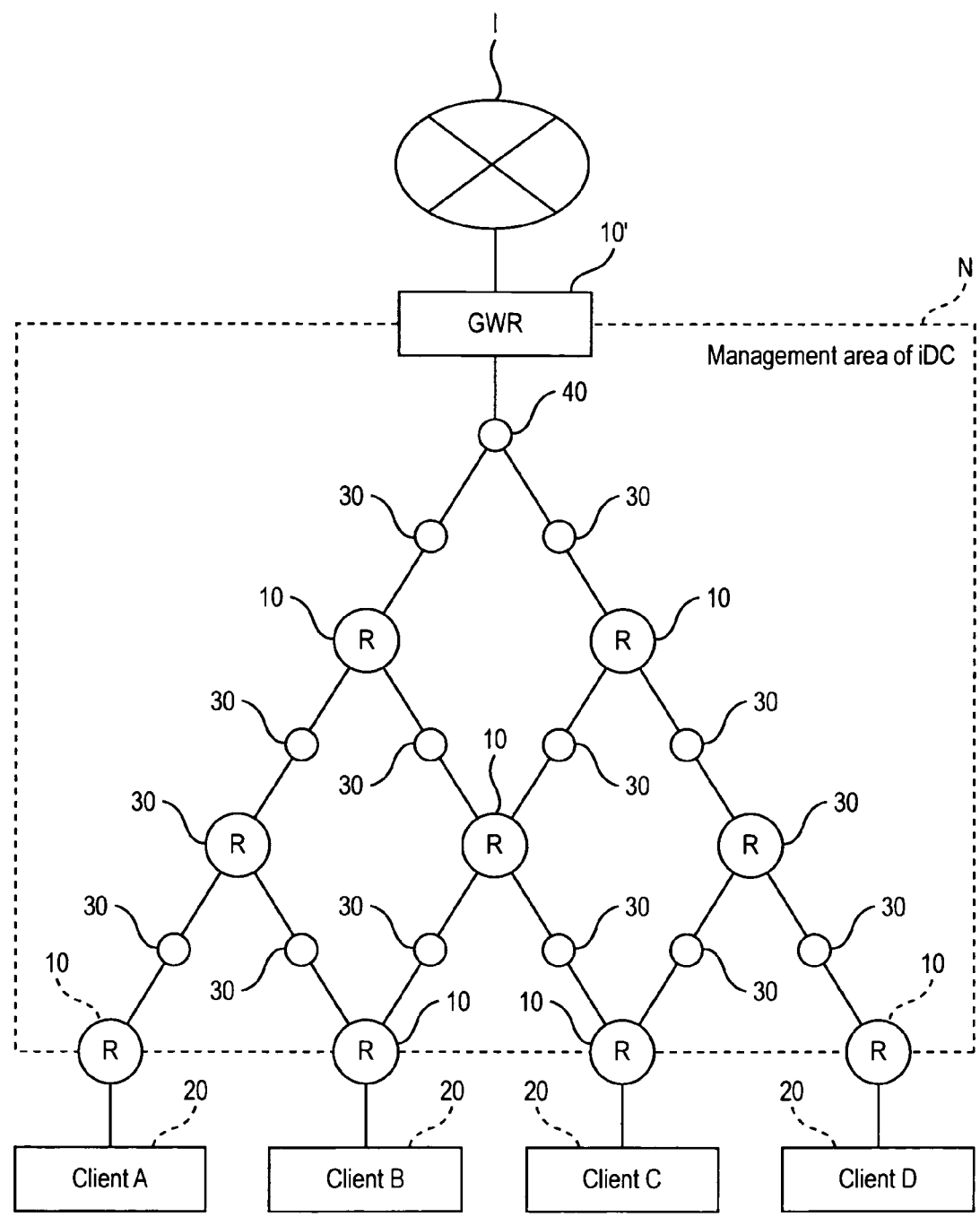
FIG. 1 is a conceptual block diagram showing a network to which the present invention is applied.

FIG. 1 is a conceptual block diagram showing a network N to which the present invention is applied. As shown in FIG. 1, the network N is provided with a plurality of routers 10. The routers 10 are connected to one another through predetermined communication cables and form a tree-structured network. The top of the tree corresponds to the upstream position.

The routers 10 at the most downstream positions in the network N are connected to server systems 20 that are managed by clients of the iDC. Each of the server systems 20, which are constructed by themselves, consists of a single server computer, or consists of two or more server computers, a router, and a switching hub.

Moreover, the router at the most upstream position functions as the so-called gateway router. In FIG. 1, a reference 10' is given to the gateway router in order to distinguish it from the other routers 10. The gateway router 10' is connected with gateway routers of the respective networks such as the ISP, iDS, intranet, WAN and LAN described above or an IX (Internet exchange) that functions as a connection point of these gateway routers through a high-speed communication line.

Further, in the network N, IP and ICMP (Internet Control Message Protocol) included in TCP/IP (Transmission Control Protocol/Internet Protocol) suite are used as a protocol corresponding to the network layer (layer 3) of the OSI (Open System Interconnection) reference model. That is, a program for communication according to IP and ICMP is installed in a ROM (Read Only Memory) of each router 10.

Figure 2:
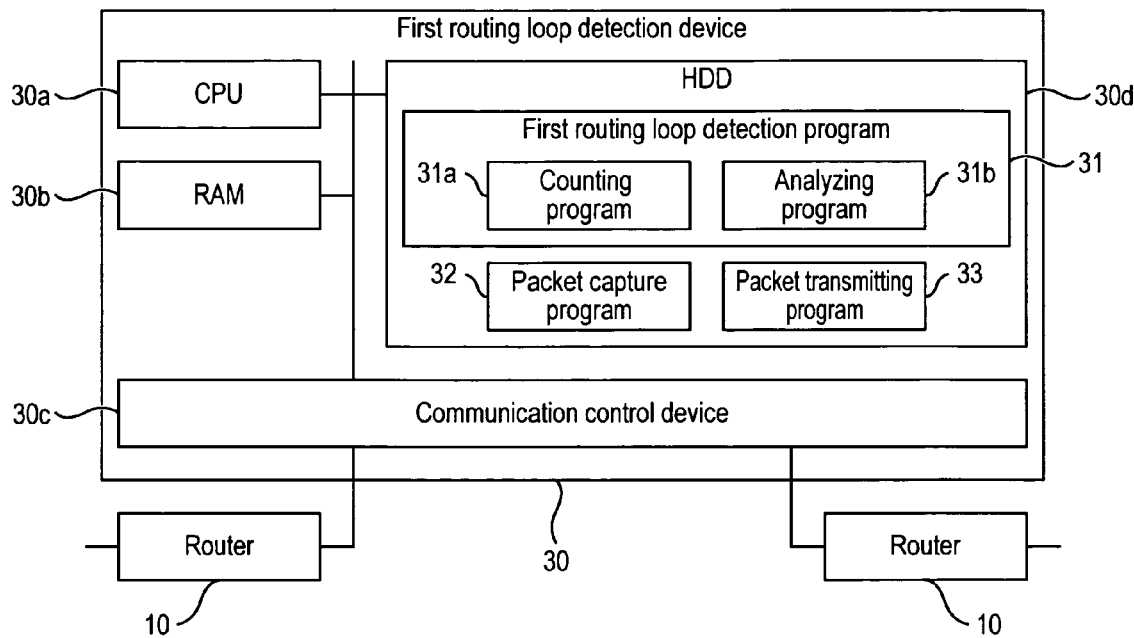
FIG. 2 is a conceptual block diagram showing a first routing loop detection device of an embodiment.

Furthermore, the network N is provided with a plurality of first routing loop detection devices 30 concerning the present invention. Each of the first routing loop detection devices 30 is positioned between a pair of routers 10, 10 to manage communication between the routers as shown in FIG. 1. FIG. 2 is a conceptual block diagram of the first routing loop detection device 30.

The first routing loop detection device 30 has a CPU (Central Processing Unit) 30a, a RAM (Random Access Memory) 30b, a communication control device 30c and an HDD (Hard Disk Drive) 30d.

The CPU 30a controls the entire system of the first routing loop detection device 30. The RAM 30b is a main memory on which a working area is developed when the CPU 30a executes various programs.

The communication control device 30c manages communication according to a protocol corresponding to a data link layer and a physical layer in the OSI reference model. The communication control device 30c is equivalent to the device that manages communication according to the protocol in the above-described router 10 (it may be a switching hub, for example).

The HDD 30d is an external memory that stores various programs and various data. The HDD 30d stores a first routing loop detection program 31 concerning the present invention, a packet capture program 32 and a packet transmitting program 33 in addition to an operating system program.

The first routing loop detection program 31 includes two module programs 31a, 31b and a program to control operations of these module programs. One of the two module programs included in the first routing loop detection program 31 is a counting program 31a that will be described below with reference to FIG. 5 and the other is an analyzing program 31b that will be described below with reference to FIG. 6.

The packet capture program 32 is located in the network layer of the OSI reference model and it makes the CPU 30a capture a packet. Namely, the packet capture program 32 controls the communication control device 30c so that the device 30c receives all the input packets to deliver them to the upper layer and returns the same packets as received to their original paths. In addition, the packet capture program 32 is set so as only to capture a packet that flows from the upstream side to the downstream side in the network N.

The packet transmitting program 33 makes the CPU 30a encapsulate segments delivered from the layer upper than the network layer as a packet and deliver it to the communication control device 30c.

Further, the CPU 30a that executes the packet capture program 32 and the communication control device 30c correspond to the packet capture device. Although it looks as if the first routing loop detection program 31 and the packet capture program 32 are installed in a single computer in FIG. 2, they may be installed in the separate computers. In such a case, the computer in which the packet capture program 32 must include the communication control device 30c to operate as the packet capture device.

Figure 3:
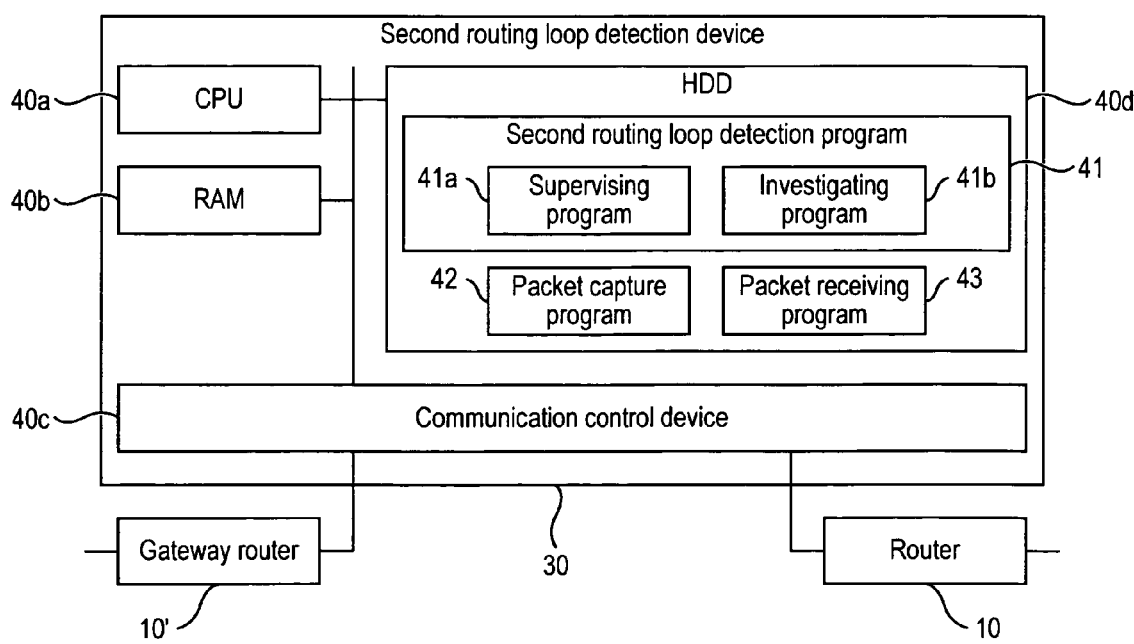
FIG. 3 is a conceptual block diagram showing a second routing loop detection device of the embodiment.

Still further, the network N includes a second routing loop detection device 40 concerning the present invention. The second routing loop detection device 40 is, as shown in FIG. 1, inserted between the gateway router 10' and the adjacent two routers 10, 10 to manage communication between the routers 10', 10 and 10. FIG. 3 is a conceptual block diagram to describe the second routing loop detection device 40.

The second routing loop detection device 40 is provided with a CPU 40a, a RAM 40b, a communication control device 40c and an HDD 40d. The hardware of the second routing loop detection device 40 is equivalent to that of the first routing loop detection device 30.

However, the HDD 40d stores the programs that are partially different from the programs stored in the HDD 30d of the first routing loop detection device 30. Specifically, the HDD 40d stores an operating system program, a second routing loop detection program 41, a packet capture program 42 and a packet receiving program 43.

The second routing loop detection program 41 includes two module programs 41a, 41b and a program to control operations of these module programs. One of the two module programs included in the second routing loop detection program 41 is a supervising program 41a that will be described below with reference to FIG. 11 and the other is an investigating program 41b that will be described below with reference to FIGS. 12 through 14.

The packet capture program 42 has the same function as that of the first routing loop detection device 30. Contrary to the packet capture program 32 of the first routing loop detection device 30, the packet capture program 42 of the second routing loop detection device 40 is set so as only to capture a packet that flows from the downstream side to the upstream side in the network N. Further, the CPU 40a that executes the packet capture program 42 and the communication control device 40c correspond to the packet capture device. For the same reason as above described, the second routing loop detection program 41 and the packet capture program 42 may be installed in the same computer or in separate computers.

The packet receiving program 43 makes the CPU 40a remove an IP header from a packet delivered from the communication control device 40c to create a segment and deliver it to the program on the upper layer.

Next, the process executed in the above-described network N will be described. In the following description, the process executed by the first routing loop detection device 30, operations and effects thereof will be described at first, and then, the process executed by the second routing loop detection device 40, operations and effects thereof will be described.

Figure 4:
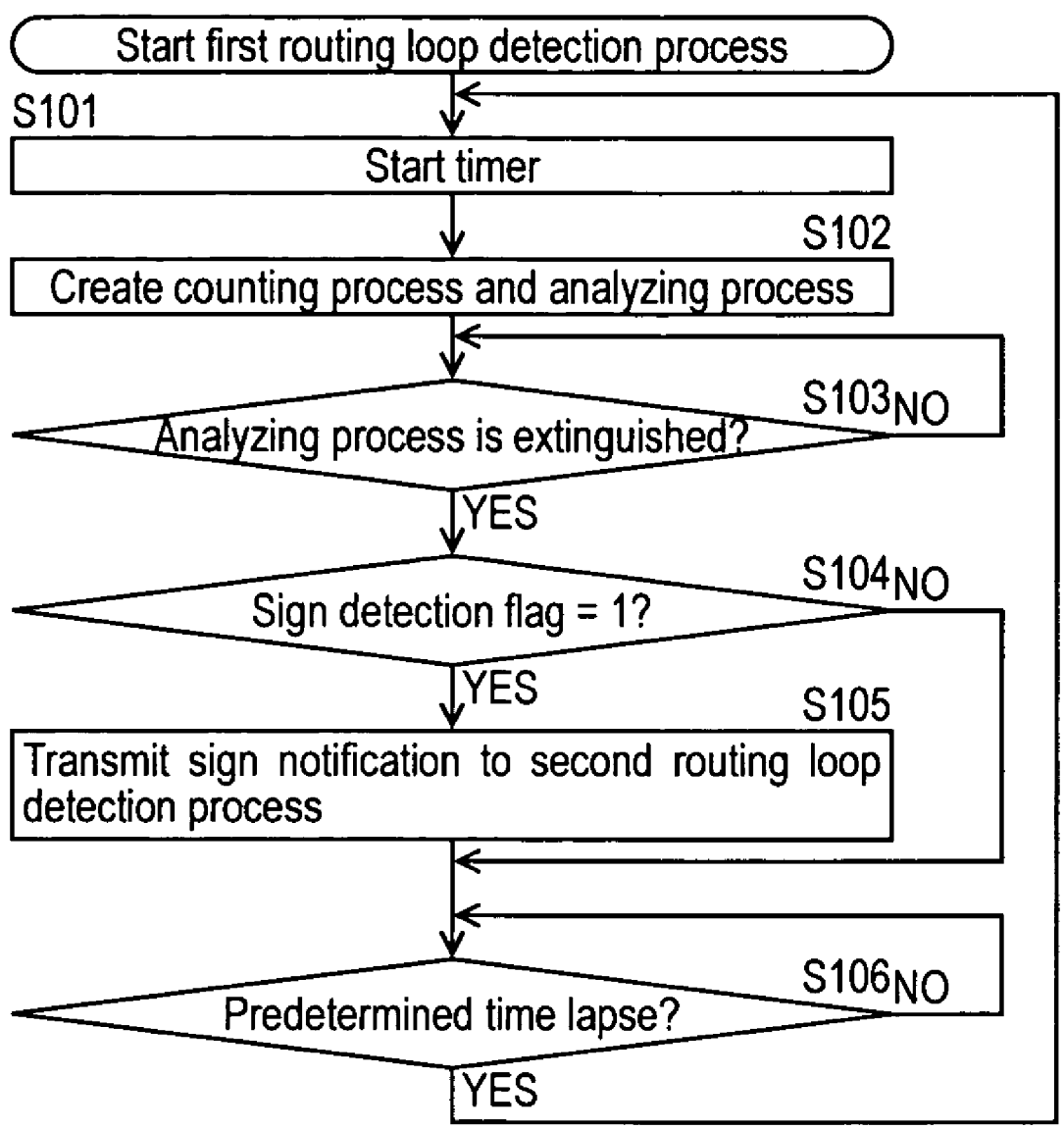
FIG. 4 is a flowchart for explaining the contents of a first routing loop detection process.

Contents of the process executed by the first routing loop detection device 30 will be described at first. In the first routing loop detection device 30, turning on the main power, the CPU 30a reads the first routing loop detection program 31 from the HDD 30d and executes the first routing loop detection process. FIG. 4 is a flowchart for explaining the contents of the first routing loop detection process.

At the first step S101 after starting the first routing loop detection process, the CPU 30a starts a timer and brings the process to step S102.

At step S102, the CPU 30a executes the counting program 31a and the analyzing program 31b. Namely, the counting process and the analyzing process are created in the first routing loop detection device 30. The counting process and the analyzing process are executed in parallel. Further, the contents of the counting process and the analyzing process will be described below with reference to FIG. 5 and FIG. 6. After creating these two processes, the CPU 30a brings the process to step S103.

At step S103, the CPU 30a waits until the analyzing process is extinguished (S103: NO). When the analyzing is extinguished (S103: YES), the CPU 30a brings the process to step S104.

At Step S104, the CPU 30a distinguishes whether a sign detection flag is "1" or not. The sign detection flag is set at "1" or "0" as a result of the execution of the analyzing process. If the sign detection flag is not "1" (S104: NO), the CPU 30a brings the process to step S106. On the other hand, if the flag is "1" (S104: YES), the CPU 30a brings the process to step S105.

At step S105, the CPU 30a transmits a sign notification to the second routing loop detection process 40. The sign notification includes the IP addresses of the routers at both ends of a detection target path in which the first routing loop detection device 30 is inserted and the information showing that a sign of occurrence of routing loop is detected. In addition, the function of the packet transmitting program 33 is used to transmit the notification. After transmission, the CPU 30a brings the process to step S106.

At step S106, the CPU 30a waits until the lapse of a predetermined time (ten minutes, for example) from the starting point of timer at step S101 (S106: NO). When the predetermined time lapses (S106: YES), the CPU 30a brings the process back to step S101 and creates a new counting process and a new analyzing process.

Accordingly, the first routing loop detection device 30 repeats the process of steps S102 through S105 at regular interval as long as the main power is turned ON.

Figure 5:
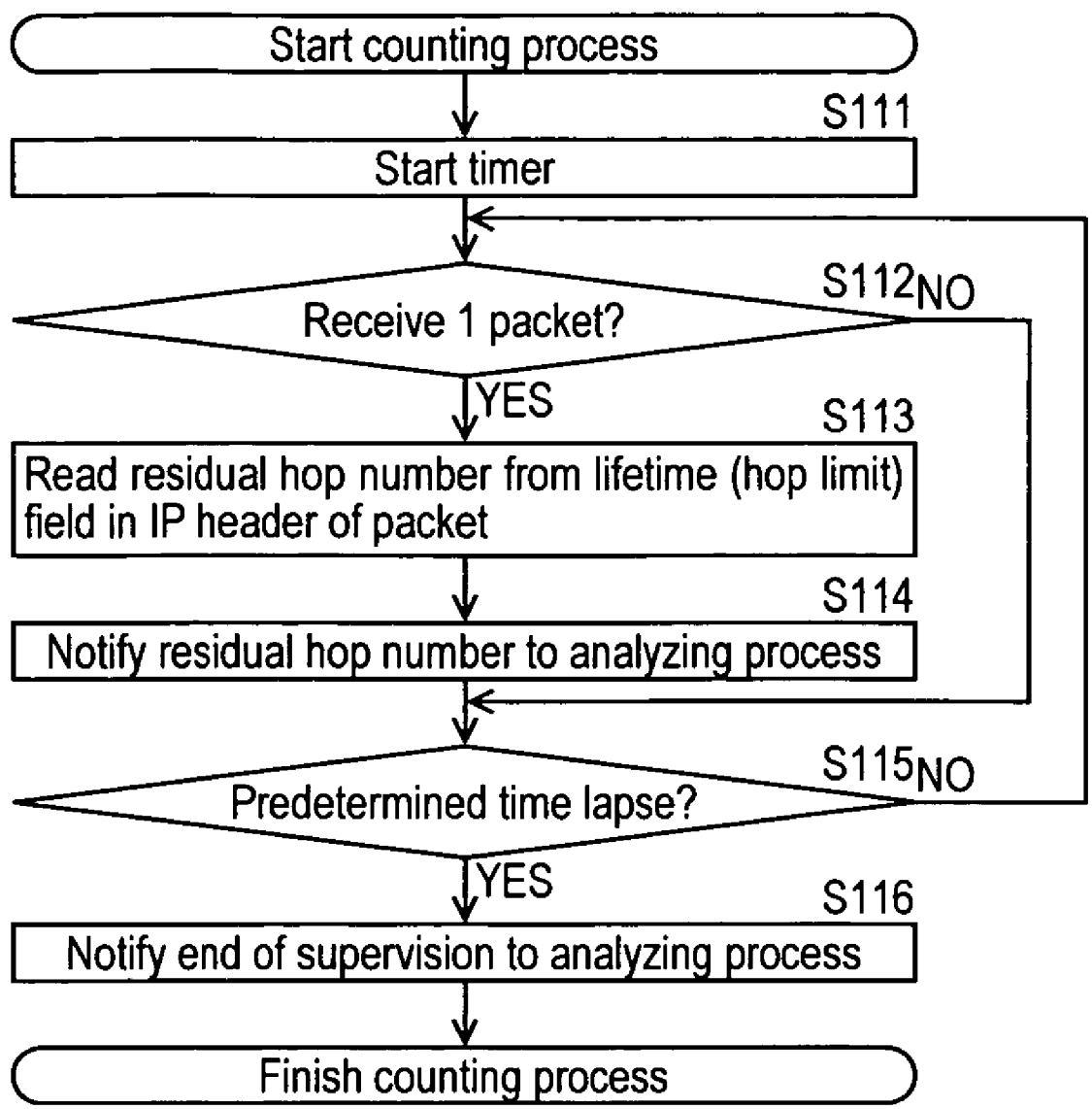
FIG. 5 is a flowchart for explaining the contents of a counting process.

FIG. 5 is a flowchart for explaining the contents of the counting process. At the first step S111 of the counting process, the CPU 30a starts a timer and brings the process to step S112. Hereinafter, the function implemented by the CPU 30a that executes the counting program 31a is referred to as a counting process 31a.

At S112, the counting process 31a discriminates whether one piece of packet data is received from the packet capture program 32 (the function by the CPU 30a that executes the program) or not. Then, when the counting process 31a did not receive one piece of packet data from the packet capture program 32 (S112: NO), it goes to step S115. On the other hand, when one piece of packet data was received (S112: YES), the process goes to step S113.

At step S113, the counting process 31a reads the residual hop number from the lifetime field (a hop limit field in the IP version 6) in the IP header of the packet, and goes to step S114.

At step S114, the counting process 31a notifies the read value of the residual hop number to the analyzing process, and goes to step S115.

At step S115, the counting process 31a checks whether a predetermined time (ten seconds, for example) lapses from the starting point of timer or not. When the predetermined time did not lapse (S115: NO), the counting process 31a goes back to step S112.

During the process loop of steps S112 through S115, the residual hop numbers of all the packets passing through the first routing loop detection device 30 from the upstream toward the downstream are sequentially notified to the analyzing process 31b. When the predetermined time lapses from the starting point of timer during the loop process, the counting process 31a branches the process from step S115 to step S116 (S115: YES).

At step S116, the counting process 31a notifies the end of the supervision to the analyzing process 31b and finishes itself.

Figure 6:
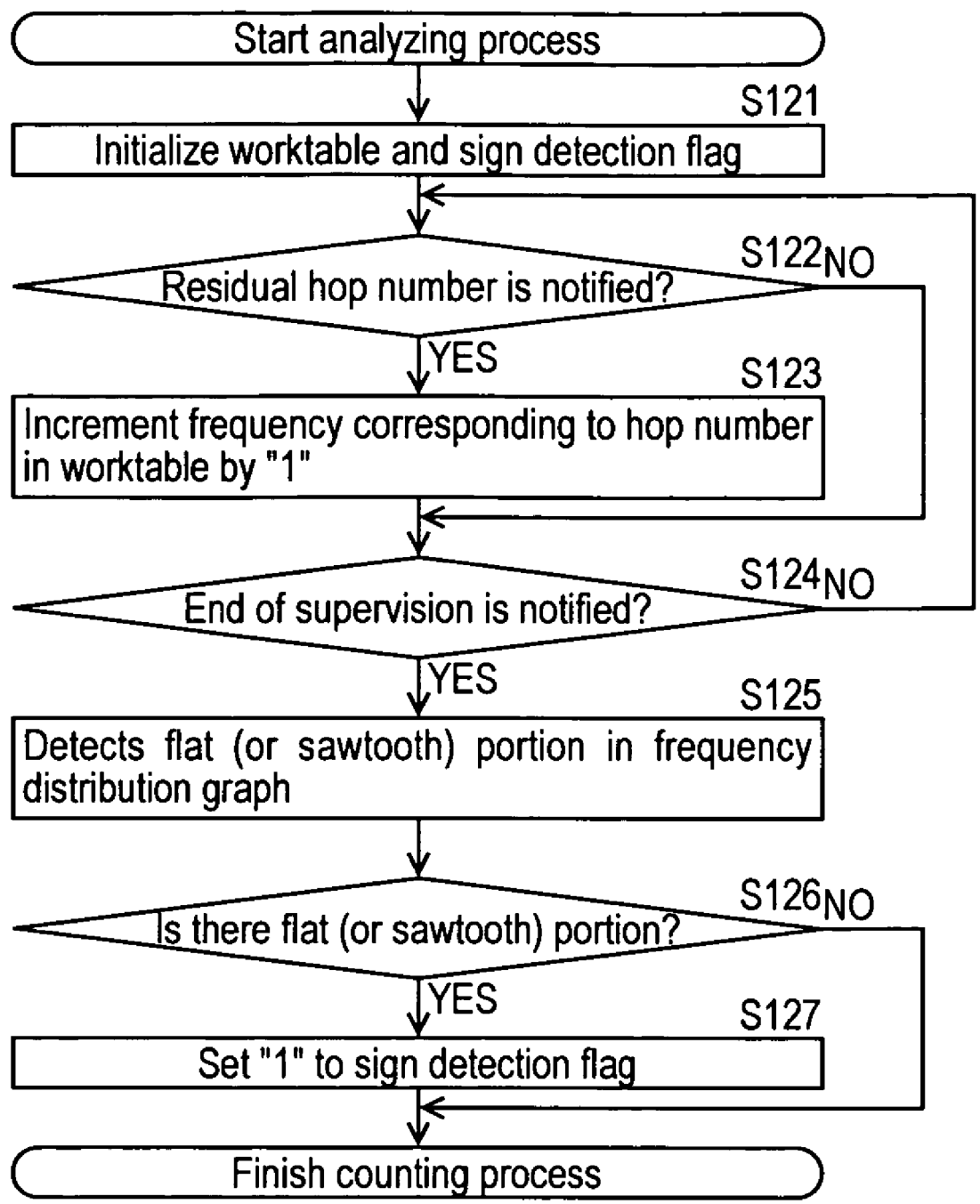
FIG. 6 is a flowchart for explaining the contents of an analyzing process.

FIG. 6 is a flowchart for explaining the contents of the analyzing process. At a first step S122 of the analyzing process, the CPU 30a initializes a worktable in the RAM 30b and initializes the sign detection flag to "0". Hereinafter, the function implemented by the CPU 30a that executes the analyzing program 31b is referred to as an analyzing process 31b.

The number of record stored in the worktable is equal to the upper limit of the hop number (255) in the lifetime field (the hop limit field for IP version 6) of an IP header. Each record includes a field for the hop number and a field for frequency. The frequency indicates the number of packets whose residual hop number is coincident with the hop number in the hop number field of the same record.

At step S121, the analyzing process 31b initializes the worktable by resetting the value in the frequency field to "0" for every record. After the initializations of the worktable and the sign detection flag, the analyzing process 31b goes to step S122.

At step S122, the analyzing process 31b checks whether the residual hop number has been notified from the counting process 31a or not. If the counting process 31a has not notified the residual hop number (S122: NO), the analyzing process 31b goes to step S124. On the other hand, if the counting process 31a has notified the residual hop number (S112: YES), the analyzing process 31b goes to step S123.

At step S123, the analyzing process 31b increments the frequency corresponding to the hop number in the worktable by "1" and goes to step S124.

At step S124, the analyzing process 31b checks whether the counting process 31a has informed the end of the supervision or not. If the counting process 31a has not informed the end of the supervision (S124: NO), the analyzing process 31b goes back to step S122.

During the process loop of steps S122 through S124, the analyzing process 31b increments the frequency in the worktable based on the residual hop number of each packet that is notified by the counting process 31a. When the end of the supervision is informed from the counting process 31a, the analyzing process 31b branches the process from step S124 to step S125 (S124: YES).

At step S125, the analyzing process 31b detects the presence or absence of a flat portion (or a sawtooth portion) in a curve of a frequency distribution graph (a histogram) based on the respective hop numbers and the frequencies thereof in the worktable.

Figure 7:
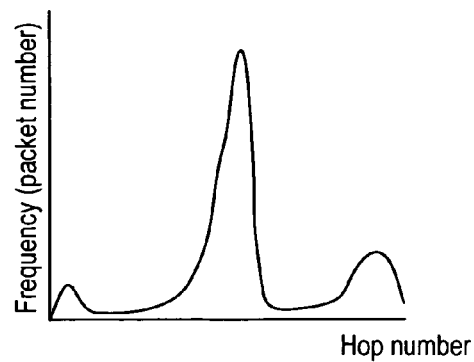
FIG. 7 is a graph showing one example of histogram when routing loop does not occur.
Figure 8:
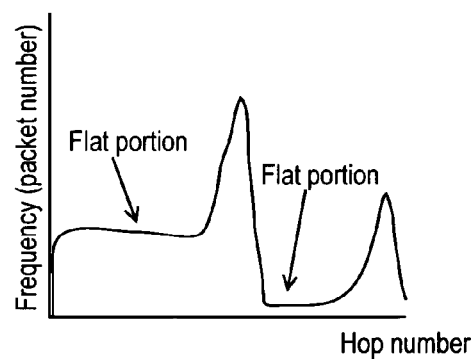
FIG. 8 is a graph showing one example of the histogram when routing loop has occurred.

Here, the histogram created based on the respective hop numbers and the frequencies thereof in the worktable will be briefly described. FIG. 7 shows one example of the histogram when routing loop does not occur and FIG. 8 shows one example of the histogram when routing loop occurs. In FIGS. 7 and 8, the axis of the frequency is a logarithmic axis.

When routing loop does not occur, as shown in FIG. 7, several peaks are formed on the histogram and both feet of each peak are formed as gently-sloping curves. The position of the peak is determined by a default value set in OS (Operation System) or in a device as the maximum hop number given to a packet. For example, the default values are "128" in the Windows (trademark of Microsoft Corp.) system, "64" in Linux system, "255" in the MacOS (trademark of Apple Computer) and also "255" in a router. In FIG. 7, the peaks appear near the points whose hop numbers are "128" and "255", respectively.

On the other hand, when routing loop occurs, as shown in FIG. 8, several peaks are formed as with the case of FIG. 7, while the feet of the peaks are almost flat. The reason why the feet are flat will be described.

Figure 9:
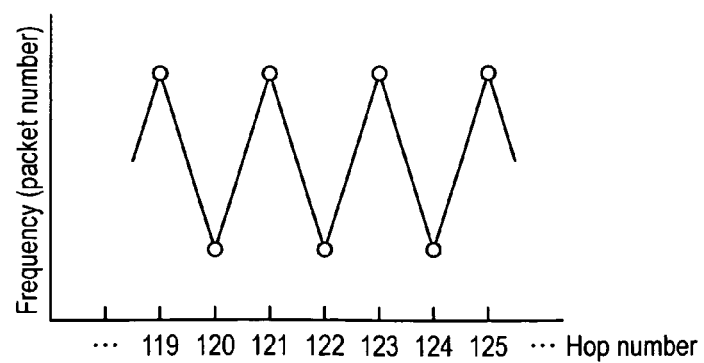
FIG. 9 is a graph showing one example of a sawtooth portion that appears in the histogram when routing loop occurs.

The most frequent pattern of routing loop is that adjacent routers repeat to transmit and receive the same packet. In such a pattern, the first routing loop detection device 30 acquires the residual hop numbers that are different by two for the same packet, "125", "123", "121", "119", for example. When routing loop occurs among three or more routers, the residual hop numbers acquired by the first routing loop detection device 30 form an arithmetic progression. Anyway, when a plurality of packets causes routing loop among the certain routers, the frequencies at discrete points (whose hop numbers are "125", "123", "121", "119" in the above example) on the hop number axis in the histogram are equal to the number of packets. In such a case, the feet of the peak has the sawtooth portion as shown in FIG. 9. The sawtooth portion appears when the residual hop numbers of the respective packets are identical (or the odd residual hop numbers in the above example) before the packets causes routing loop. However, the residual hop numbers of the respective packets are almost different to one another in actuality. Thus, when the residual hop numbers are different to one another, the frequencies at the respective hop numbers in the histogram are averaged. As a result, the feet of the peak become almost flat. At step S125 in FIG. 6, presence or absence of the flat portion (or the sawtooth portion) is detected. Although there are various detecting methods, one example will be conceptually described.

At first, the frequency axis of the histogram is divided into the segments having a predetermined width ("5", for example) to divide "225" pieces of data of the graph curve into the respective segments. Then it is checked whether the data number of any section exceeds a predetermined threshold value or not. If there is a section whose data number exceeds the threshold value, it is determined that a flat portion (or a sawtooth portion) exists on the histogram.

At the next step S126, the analyzing process 31b discriminates whether a flat portion (a sawtooth portion) can be detected on the histogram or not. When a flat portion (a sawtooth portion) cannot be detected (S126: NO), the analyzing process 31b finishes itself. When a flat portion (a sawtooth portion) has been detected (S126: YES), the analyzing process 31b goes to step S127.

At step S127, the analyzing process 31b sets "1" to the sign detection flag and finishes itself.

Execution of the above described first routing loop detection process operates the first routing loop detection device 30 as follows.

All packets transmitted from the upstream to the downstream along the path on which the first routing loop detection device 30 is inserted are captured by the first routing loop detection device 30. During a period when the analyzing process 31b is generated (S101, S102, S106) and the counting process 31a is generated (S111, S115), the residual hop numbers of all the captured packets are read (S112 through S114), and a worktable is generated based thereon (S122, S123). After the period for reading the residual hop number by the counting process 31a is finished (S115: YES, S116 and S124: YES), the presence or absence of a flat portion (or a sawtooth portion) in a curve of a frequency distribution graph (a histogram) based on the respective hop numbers and the frequencies thereof in the worktable is detected (S125). When a flat portion (a sawtooth portion) has been detected (S126: YES), the sign notification including the IP addresses of the routers at both ends of a detection target path in which the first routing loop detection device 30 is inserted is transmitted to the second routing loop detection device 40 (S105).

Therefore, the first routing loop detection device 30 periodically repeats to read the residual hop numbers of all the packets at the constant interval (S111 through S116, S122 through S124) and to discriminate propriety of transmission of the sign notification based on the read residual hop numbers (S125 through S127, S103 through S105) as long as the main power remains ON (S101, S102, S106).

According to the operations, the first routing loop detection device 30 has the following effects.

According to the conventional method (the above-described third method), it was necessary to check whether the contents are identical or not for every target packet. The data amount for a packet required by the check is 13 bytes (2 bytes (ID information)+1 byte (lifetime)+2 bytes (header checksum)+4 bytes (source IP address)+4 bytes (destination IP address)) in IP version 4. The data amount in IP version 6 is 36 bytes (3 bytes (flow label)+1 byte (hop limit)+16 bytes (source IP address)+16 bytes (destination IP address)). On the other hand, the first routing loop detection device 30 reads the residual hop number (1 byte) only and increments the frequency in the worktable for a packet even if all the packets are supervised. Further, the device 30 does not execute a heavy process such as a detection of the matching for every combination of every packet. Therefore, when the huge number of packets are input, almost no load is given to the first routing loop detection device 30 during packet capturing. The device 30 can properly execute the process even when adjacent routers are connected by a high-speed communication line, that is, even in a large-scale network.

Further, if only the packet from a certain source IP address causes routing loop and the other packets do not cause routing loop, such routing loop cannot be detected by the traceroute. However, if such routing loop passes through the first routing loop detection device 30, it can be certainly detected by the first routing loop detection device 30. Since the first routing loop detection device 30 is inserted in every path that connects adjacent routers, the routing loop caused in the management area must pass through any one of the first routing loop detection devices 30. Therefore, the routing loop occurs in the management area is certainly detected.

A flat portion (or a sawtooth portion) on a histogram is generated by transmitting many packets for the traceroute or transmitting many packets whose residual hop numbers are different to one another as attack in addition to having a packet causing routing loop. That is, if routing loop occurs, a flat portion (or a sawtooth portion) will surely arise in a histogram. However, the flat portion (or a sawtooth portion) in a histogram does not necessarily show routing loop. Therefore, it can be said that the first routing loop detection device 30 does not overlook the signs of occurrence of routing loop at least.

If the time interval for discriminating propriety of transmission of the sign notification (S106) is set up for a long time like an hour, a load given to the first routing loop detection device 30 and a load given to the traffic of the network N can be reduced as small as possible. On the other hand, if the time interval is set up for a short time like a minute, routing loop can be promptly detected. In either cases, it is preferable that the time interval for discriminating propriety of transmission of the sign notification (S106) is shorter than the time interval for reading a residual hop number from a packet (S115).

Figure 10:
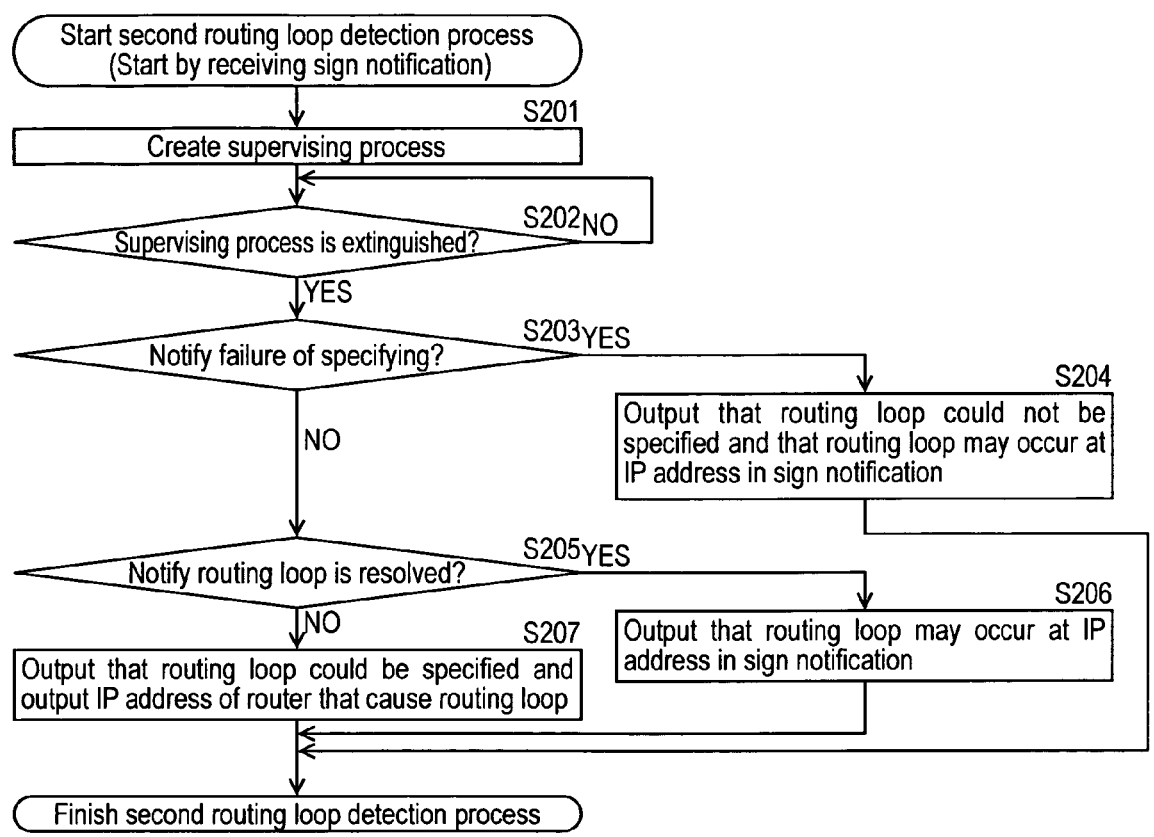
FIG. 10 is a flowchart for explaining the contents of a second routing loop detection process.

Next, the contents of the process executed by the second routing loop detection device 40 will be described. When the second routing loop detection device 40 receives a sign notification from any one of the first routing loop detection devices 30 through the function of the packet receiving program 43, the notification triggers the CPU 40a to read the second routing loop detection program 41 from the HDD 40d and to execute the second routing loop detection process. FIG. 10 is a flowchart for explaining contents of the second routing loop detection process.

At a first step S201 after the second routing loop detection process starts, the CPU 40a executes the supervising program 41a. That is, a supervising process is created in the second routing loop detection device 40.

Figure 11:
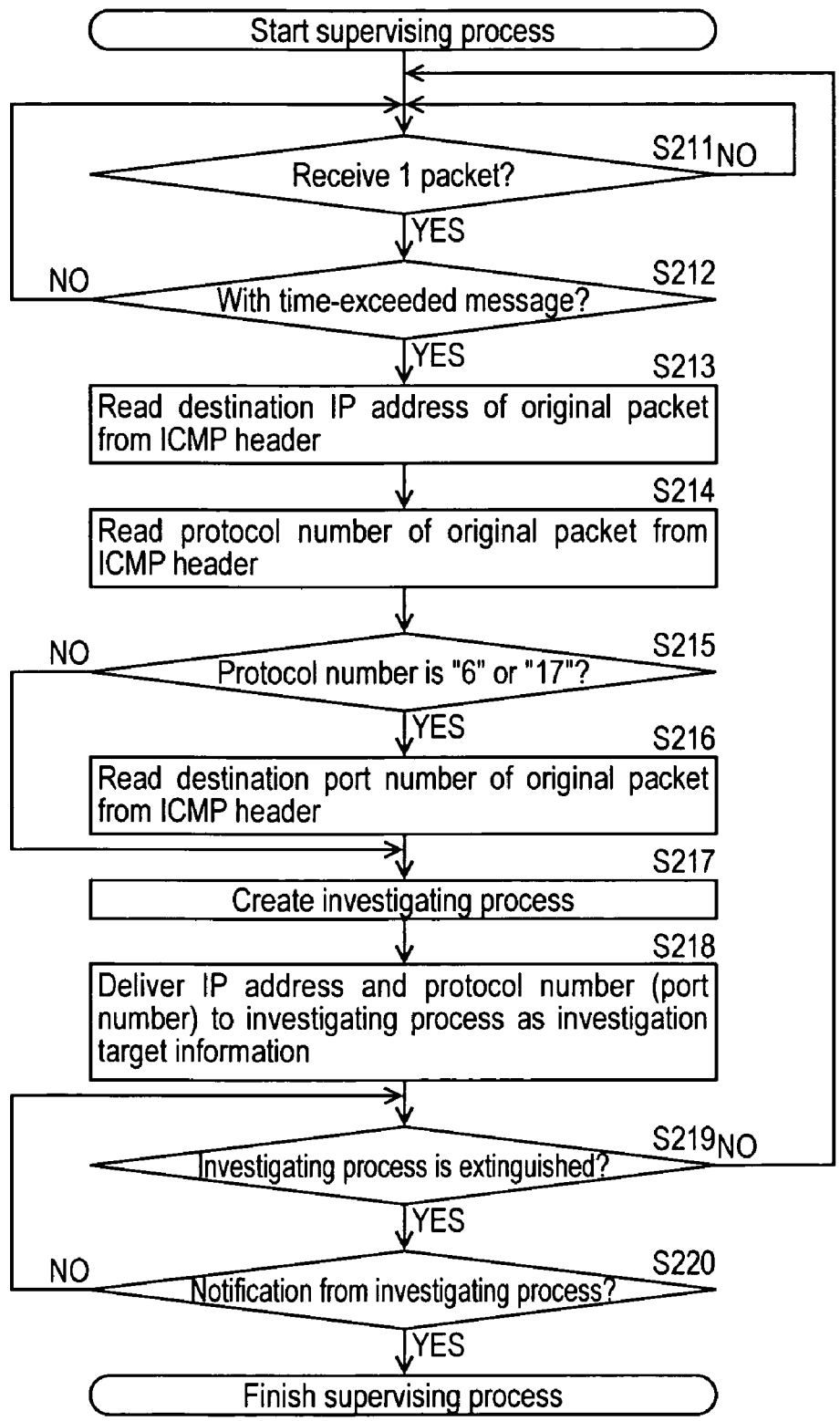
FIG. 11 is a flowchart for explaining the contents of a supervising process.

FIG. 11 is a flowchart for explaining contents of the supervising process. At a first step S211 of the supervising process, the CPU 40a waits until it receives data of one packet from a function of the CPU 40a that executes the packet capture program 42 (S211: NO). Hereinafter, the function implemented by the CPU 40a that executes the supervising program 41a is referred to as a supervising process 41a. Receiving data of one packet from the packet capture program 42 (S211: YES), the supervising process 41a goes to step S212.

At Step S212, the supervising process 41a discriminates whether the packet has a time-exceeded message or not. The time-exceeded message is an ICMP header whose value in the type field is "11". The process at step S212 will be specifically described. The supervising process 41a discriminates whether the value in the protocol number field in IP header of the packet captured at S211 is "1". If the value of the protocol number field is "1", since the ICMP header is added to the IP header, the process further checks whether the value in the type field o the ICMP header is "11". When the protocol number is not "1" or the value in the type field is not "11" even if the protocol number is "1", the supervising process 41a judges that the captured packet does not include a time-exceeded message (S212: NO), going back to step S211. When the protocol number is "1" and the value in the type field is "11", the supervising process 41a judges that the captured packet includes a time-exceeded message (S212: YES), going to step S213.

At step S213, on the basis of the packet captured at S211, the supervising process 41a reads the destination IP address of an original packet that caused the captured packet. Specifically, an IP header and a part of segment of an original packet (a discarded packet whose residual hop number becomes zero before it reaches its destination) that caused a packet with a time-exceeded message are copied to an ICMP option field of an ICMP header as the time-exceeded message. The supervising process 41a reads the original destination IP address from the ICMP option field. After reading, the supervising process 41a goes to step S214.

At step S214, the supervising process 41a reads a protocol number that is recorded in the protocol number field in the IP header of the original packet that caused the packet with the time-exceeded message from the ICMP option field of the packet received at step S211. After reading, the supervising process 41a goes to step S215.

At S215, the supervising process 41a discriminates whether the protocol number read at step S214 is "6" or "17" or not. That is, the supervising process 41a discriminates whether the original packet that caused the packet with the time-exceeded message had a TCP header or a UDP (User Datagram Protocol) header or not. If the protocol number is not "6" nor "17" (S215: NO), the supervising process 41a goes to step S217. On the other hand, if the protocol number is "6" or "17" (S215: YES), the process goes to step S216.

At step S216, the supervising process 41a reads a destination port number recorded in a destination port number field of layer 4 header of the original packet that caused the time-exceeded message from the ICMP option field of the packet received at step S211. After receiving, the supervising process 41a goes to step S217.

At step S217, the supervising process 31a executes the investigating process. Namely, the investigating process is created in the second routing loop detection device 40. The contents of the investigating process will be described below with reference to FIGS. 12 through 14. After creating the investigating process, the supervising process 41a goes to step S218.

At step S218, the supervising process 41a delivers investigation target information to the investigating process. The investigation target information includes the IP address and the protocol number read at S213 and S214 and the port number if it was read at S215 and S216. After that, the supervising process 41a goes to step S219.

At step S219, the supervising process 41a discriminates whether the investigating process has been extinguished or not. If the investigating process still alive (S219: NO), the supervising process 41a goes to step S220.

At step S220, the supervising process 41a checks if the investigating process gave the below-described notification. If the notification was not given from the investigating process (S220: NO), the supervising process 41a goes back to step S219.

If the investigating process is extinguished during the process loop of steps S219 and S220 before the notification is given from the investigating process (S219: YES), the supervising process 41a goes back to step S211. On the other hand, if the notification is received from the investigating process during the process loop before the investigating process is extinguished (S220: YES), the supervising process 41a finishes itself.

Figure 12:
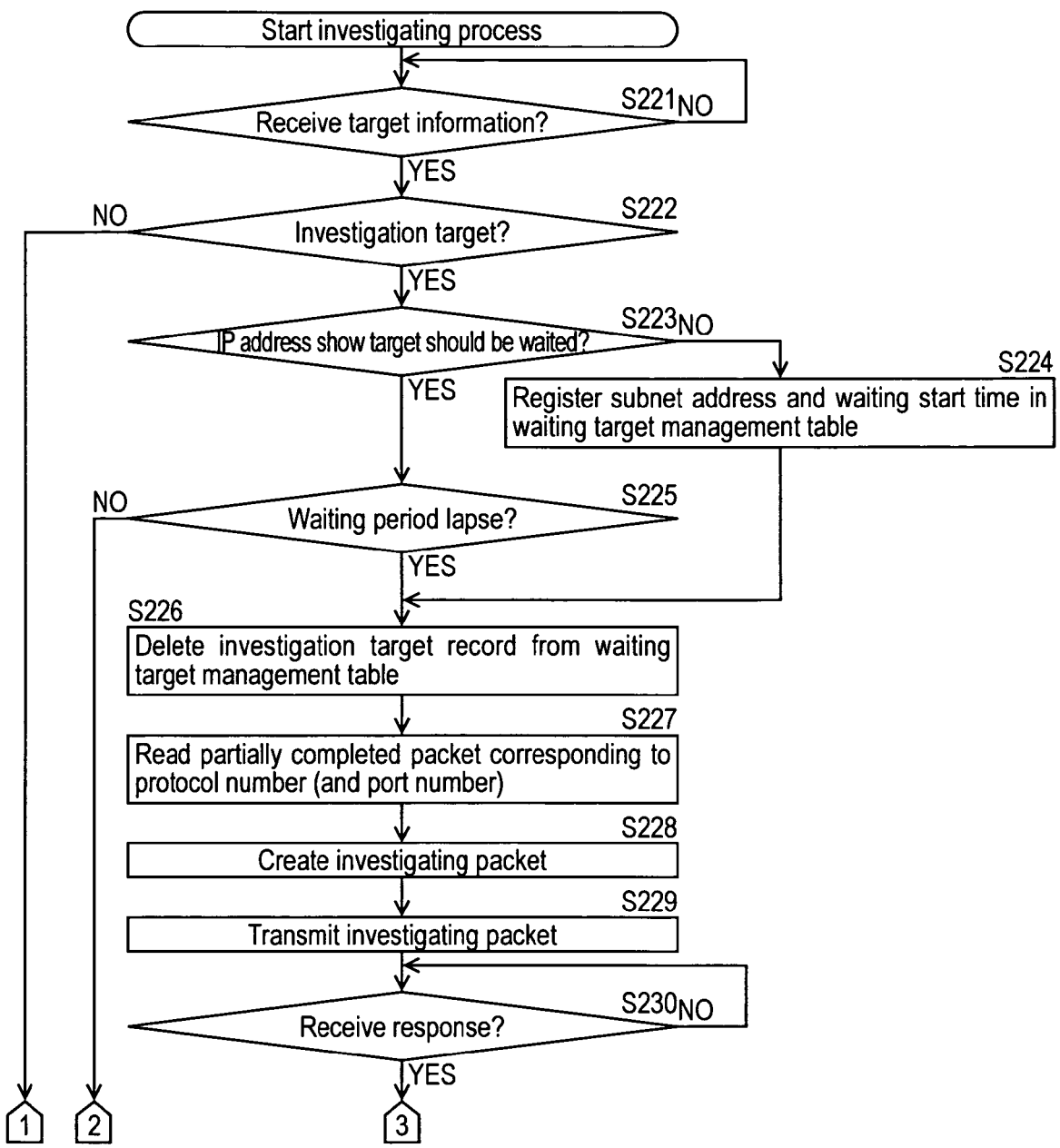
FIGS. 12 and 13 are flowcharts for explaining the contents of an investigation process.
Figure 13:
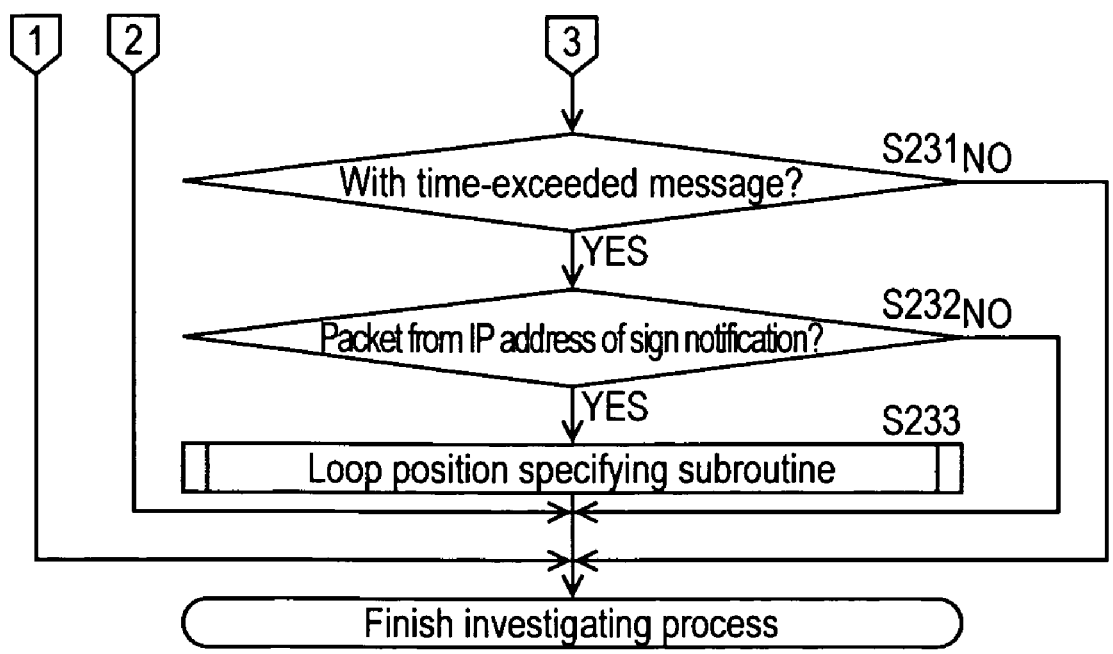

FIG. 12 and FIG. 13 are flowcharts for explaining the contents of the investigating process. At a first step S221 after the investigating process starts, the CPU 40a waits until it receives the investigation target information from the supervising process 41a (S221: NO). Hereinafter, the function implemented by the CPU 40a that executes the investigating program 41b is referred to as an investigating process 41b. Receiving the investigation target information from the supervising process 41a (S221: YES), the investigating process 41b goes to step S222.

At step S222, the investigating process 41b discriminates whether the destination indicated by the investigation target information delivered from the supervising process 41a should be investigated or not.

Destinations that do not need investigation are managed by a filtering table that will be prepared in the HDD 40d. The IP address, the protocol number and the port number that are selected by the administrator of the network N are registered in the filtering table as conditions for selecting destinations that do not need investigation.

If one of the IP address and the protocol number (and the port number if exists) in the investigation target information maches the information registered in the filtering table (S222: NO), the investigating process 41b finishes the investigation because the destination indicated by the investigation target information does not need investigation.

On the other hand, the IP address and the protocol number (and the port number if exists) are different from the information registered in the filtering table (S222: YES), the investigating process 41b goes to step S223 because the destination indicated by the investigation target information needs investigation.

At step S223, the investigating process 41b discriminates whether the IP address in the investigation target information shows that the target should wait for investigation.

The targets that should wait for investigation are managed by a waiting target management table in the RAM 40b. The waiting target management table stores a network address of the subnet including an IP address that was investigated and is waiting until a predetermined waiting period lapses from the latest investigation. Specifically, the waiting target management table stores records having a network address and a start time for waiting.

If the network address of the subnet including the IP address in the investigation target information is not registered in the waiting target management table (S223: NO), the investigating process 41b goes to step S224 because the IP address shows the target that should be investigated as soon as possible.

At step S224, the investigating process 41b registers a record consisting of the network address of the subnet including the IP address and current time as the waiting start time in the waiting target management table in the RAM 40b. After registration, the investigating process 41b goes to step S227.

On the other hand, if the network address of the subnet including the IP address in the investigation target information is registered in the waiting target management table (S223: YES), the investigating process 41b goes to step S225 because the IP address shows the target that should wait for investigation.

At step S225, the investigating process 41b checks whether a predetermined waiting period (10 minutes, for example) lapses from the waiting start time corresponding to the network address of the subnet including the IP address. If the waiting period does not lapse from the waiting start time (S225: NO), the investigating process 41b finishes itself. On the other hand, if the waiting period lapses from the waiting start time (S225: YES), the investigating process 41b goes to step S226.

At step S226, the investigating process 41b deletes the record corresponding to the network address of the subnet including IP address of the investigation target from the waiting target management table. After deletion, the investigating process 41b goes to step S227.

At step S227, the investigating process 41b reads a partially completed packet corresponding to the investigation target information from the HDD 40d.

Here, the partially completed packet has invariable information even if any destination becomes an investigation target that is installed in a predetermined field of a header thereof. The partially completed packet is prepared for creating the investigating packet by rewriting contents corresponding to the investigation target only. That is, since the partially completed packet is stored in the HDD 40d, the investigating packet can be easily completed based on the partially completed packet without using a program equivalent to the packet transmitting program 33 shown in FIG. 2.

Further, the partially completed packet is prepared for each protocol number. Namely, the HDD 40d stores the partially completed packets whose contents in the protocol number field of the IP header are different to one another. The number of the partially completed packets is equal to the number of the protocol number. However, only one kind of a partially completed packet may be prepared. In either cases, the residual hop number of the partially completed packet is set at the maximum value "255".

When the number of the partially completed packets is equal to the number of the protocol numbers as in the former case, an ID number field, a header checksum field and a destination IP address field in an IP header should be rewritten according to an investigation target in IP version 4 and a destination IP address field in an IP header should be rewritten according to an investigation target in IP version 6.

On the other hand, if only one kind of a partially completed packet is prepared as in the later case, the protocol number field in the IP header should be also rewritten according to an investigation target in IP version 4 and a next header field in the IP header should be also rewritten according to an investigation target in IP version 6.

Moreover, any one of plurality of partially completed packets prepared in the HDD 40d includes a layer 3 header (except an IP header) or a layer 4 header corresponding to the protocol number. Particularly, a partially completed packet whose protocol number is "6" or "17" includes a TCP header or a UDP header as the layer 4 header. In the two partially completed packets having these layer 4 headers, a destination port number field and a checksum field should be also rewritten according to the investigation target.

At step S227, the investigating process 41b reads a partially completed packet corresponding to the protocol number (and the port number if exists) in the investigation target information from the HDD 40d and goes to step S228.

At step S228, the investigating process 41b rewrites the contents of the predetermined fields of the partially completed packet read from the HDD 40d to create the investigating packet. After creation, the investigating process 41b goes to step S229.

At step S229, the investigating process 41b delivers the investigating packet created at step S228 to the communication control device 40c to transmit the investigating packet to the IP address in the investigation target information. After transmission, the investigating process 41b goes to step S230.

At step S230, the investigating process 41b waits until receiving a packet in response to the investigating packet (S230: NO). The packet is received by the function of the packet receiving program 43. Receiving the packet in response to the investigating packet (S230: YES), the investigating process 41b goes to step S231.

At step S231, the investigating process 41b discriminates whether the packet received in response to the investigating packet has the time-exceeded message or not. If the received packet does not include the time-exceeded message (S231: NO), the investigating process 41b finishes itself. If the received packet has the time-exceeded message (S231: YES), the investigating process 41b goes to step S232.

At step S232, the investigating process 41b discriminates whether the source IP address of the packet received in response to the investigating packet is identical to the IP address in the sign notification or not. If the source IP address of the packet received in response to the investigating packet is different from the IP address in the sign notification (S232: NO), the investigating process 41b finishes itself. On the other hand, if the source IP address of the packet received in response to the investigating packet is identical to the IP address in the sign notification (S232: YES), the investigating process 41b goes to step S233.

Figure 14:
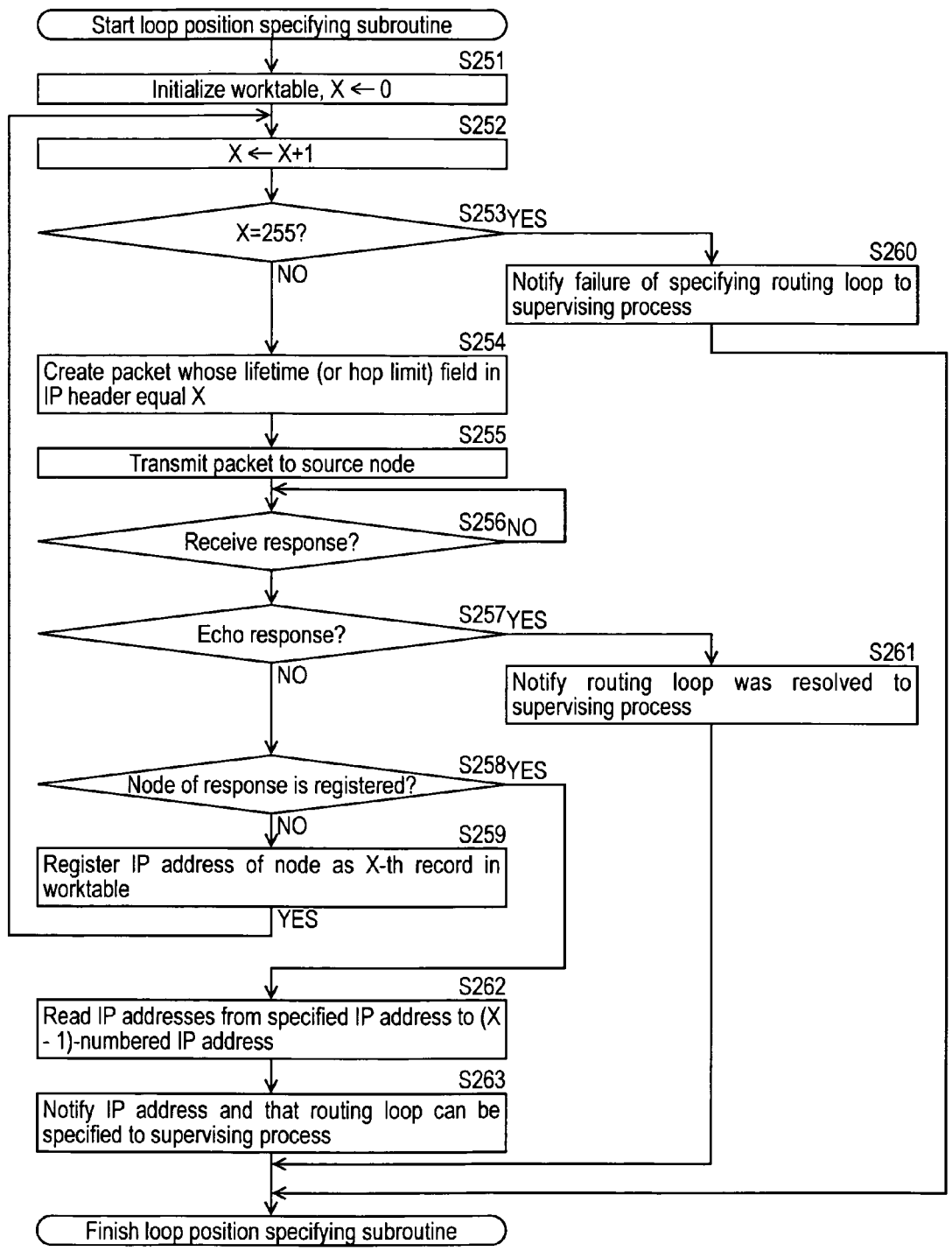
FIG. 14 is a flowchart for explaining the contents of a loop position specifying subroutine.

At step S233, the investigating process 41b executes a loop position specifying subroutine. FIG. 13 and FIG. 14 show flowcharts for explaining the contents of the loop position specifying subroutine.

At a first step S251 after the loop position specifying process starts, the investigating process 41b initializes the worktable in the RAM 40b and sets a value of variable X to zero. Further, the worktable contains IP addresses. The investigation process 41b initializes the worktable by deleting all records in the worktable. After that, the investigating process goes to step S252.

At step S252, the investigating process 41b increments the substituted value of the variable X by "1". After the increment, the investigating process 41b goes to S253.

At step S253, the investigating process 41b checks whether the substituted value of the variable X is "255" or not. If the substituted value of the variable X is not "255" (S253: NO), the investigating process 41b goes to step S254.

At step S254, the investigating process 41b creates a packet whose lifetime (or hop limit) field in an IP header has the substituted value of the variable X and has an echo request message. The echo request message is an ICMP header whose type field is "8". After creating the packet, the investigating process 41b goes to step S255.

At step S255, the investigating process 41b transmits the packet created at step S254 to the IP address of the source node of the packet received at S230 and goes to step S256.

At step S256, the investigating process 41b waits until receiving a packet in response to the packet transmitted at step S255 (S256: NO). When the packet as the response is received (S256: YES), the investigating process 41b goes to step S257. The packet is received by the function of the packet receiving program 43.

At step S257, the investigating process 41b checks whether the received packet has an echo response message or not. The ICMP header having "0" in the type field is called an echo response message. The investigating process 41b checks whether the echo response message is included in the received packet except for the IP header or not. If the received packet did not have an echo response message (S257: NO), the investigating process 41b determines that the received packet has a time-exceeded message and goes to step S258.

At step S258, the investigating process 41b discriminates whether the IP address of the node from which the packet with the time-exceeded message was received has been registered in the worktable in the RAM 40b or not. Specifically, the investigating process 41b reads the IP address from the source IP address field of the IP header of the packet with the time-exceeded message and searches the worktable for the read IP address to discriminate whether the read IP address can be detected in the worktable. If the IP address of the node from which the packet with the time-exceeded message was received has not been registered in the worktable in the RAM 40b (S258: NO), the investigating process 41b goes to step S259.

At step S259, the investigating process 41b registers the IP address of the node from which the packet with the time-exceeded message was received in the worktable. Specifically, the investigating process 41b reads the IP address from the source IP address field of the IP header of the packet with the time-exceeded message and records the IP address with the substituted value of the variable X in the worktable. After recording, the investigating process 41b goes back to step S252.

If the substituted value of the variable X reaches "255" during the process loop of steps S252 through S259 (S253: YES), the investigating process 41b branches the process from step S253 to step S260.

At step S260, the investigating process 41b gives a notification indicating the failure of specifying a router that causes routing loop to the supervising process 41a. After notification, the investigating process 41b finishes the loop position specifying subroutine of FIG. 14 and finishes the investigating process itself shown in FIG. 12 and FIG. 13.

If a packet with an echo response message in response to the packet with the echo request message is received before the substituted value of the variable X reaches "255" during the process loop of steps S252 through S259, the investigating process 41b branches the process from step S257 to step S261 (S257: YES).

At step S261, the investigating process 41b notifies that the routing loop was resolved to the supervising process 41a. After information, the investigating process 41b finishes the loop position specifying subroutine of FIG. 14 and finishes the investigating process itself shown in FIG. 12 and FIG. 13.

Further, if a packet with a time-exceeded message is received again from the node whose IP address was once registered in the worktable before the substituted value of the variable X reaches "255" during the process loop of steps S252 through S259, the investigating process 41b branches the process from step S258 to step S262 (S258: YES).

At step S262, the investigating process 41b specifies the IP address of the node that transmits the packet with the time-exceeded message again and reads IP addresses from the specified IP address to the (X-1)-numbered IP address from the worktable. After reading, the investigating process 41b goes to step S263.

At step S263, the investigating process 41b notifies the IP address read at step S262 and that the router causing routing loop can be specified to the supervising process 41a. After information, the investigating process 41b finishes the loop position specifying subroutine of FIG. 14 and finishes the investigating process itself shown in FIG. 12 and FIG. 13.

As described above, the investigating process 41b gives some notification about the result of the loop position specifying process to the supervising process 41a by executing one of steps S260, S261 and S263. Further, the supervising process 41a finishes itself when it receives some notification from the investigating process 41b before the investigating process 41b is extinguished (S220: YES). However, the investigating process 41b may finish without executing the loop position specifying subroutine (that is, without any notification, S222: NO, S225: NO, S231: NO). In such a case (S219: NO), the supervising process 41a supervises that a packet with a time-exceeded message will be captured again (S211, S212) and continues supervision until the investigating process gives some notifications.

On the other hand, in the second routing loop detection process, the CPU 40a creates the supervising process at step S201, and then, supervises extinction of the supervising process 41a (S202: NO). When the supervising process 41a is extinguished by receiving some notifications from the investigating process 41b (S202: YES), the CPU 40a brings the process to step S203.

At step S203, the CPU 40a discriminates whether the investigating process 41b notified the failure of specifying a router that causes routing loop to the supervising process 41a or not. If the investigating process 41b notified the failure of specifying to the supervising process 41a (S203: YES), the CPU 40a brings the process to step S204.

At step S204, the CPU 40a outputs that a router that causes routing loop could not be specified and that the router indicated by the IP address included in the sign notification may cause routing loop. For instance, a screen that describes the above information may be displayed on the monitor or an E-mail that includes the above information may be transmitted to a personal computer of the administrator of the network N. After outputting, the CPU 40a finishes the second routing loop detection process.

On the other hand, if the investigating process 41b did not notify the failure of specifying to the supervising process 41a (S203: NO), the CPU 40a brings the process to step.

At step S205, the CPU 40a discriminates whether the investigating process 41b notified that the routing loop was resolved to the supervising process 41a or not. If the investigating process 41b notified that the routing loop was resolved to the supervising process 41a (S205: YES), the CPU 40a brings the process to step S206.

At step S206, the CPU 40a outputs that the router indicated by the IP address included in the sign notification may cause routing loop. The information may be displayed on the monitor or may be transmitted as E-mail. After outputting, the CPU 40a finishes the second routing loop detection process.

On the other hand, if the investigating process 41b did not notify that the routing loop was resolved to the supervising process 41a (S205: NO), the CPU 40a assumes that the supervising process 41a receives the notification showing that the router of the source of routing loop could be specified, and brings the process to step S207.

At step S207, the CPU 40a outputs that routing loop occurs and that the source of the routing loop could be specified, then the CPU 40a outputs the IP address notified to the supervising process 41a as the information of the source. The information may be displayed on the monitor or may be transmitted as E-mail. After outputting, the CPU 40a finishes the second routing loop detection process.

Since the second routing loop detection process is executed as described above, the second routing loop detection device 40 functions as follows.

When the second routing loop detection device 40 receives a sign notification from any one of the first routing loop detection devices 30, it creates the supervising process 41a to supervise packets with time-exceeded messages passing from the inside of the network N to the outside (S201, S211, S212). When the second routing loop detection device 40 captures a packet with a time-exceeded message (S212: YES), the second routing loop detection device 40 reads information about the destination (a destination IP address, the protocol number, the destination port number) of the original packet that caused the time-exceeded message based on the time-exceeded message (S213 through S216) to specify the path from the gateway router 10' to the destination of the original packet and creates the investigating process 41b to start investigation (S217, S218, S221).

Then, the second routing loop detection device 40 transmits an investigating packet to an investigation target and waits the response (S226 through S230) when the investigation target should be investigated and the waiting period lapses (S222: YES, S225: YES).

If a packet that does not have a time-exceeded message is received as a response, the second routing loop detection device 40 restarts the supervising process (S231; NO, S219; YES, S211, S212). If a packet with a time-exceeded message is received as a response (S231; YES), the second routing loop detection device 40 discriminates whether the source address of the packet is identical to the IP address notified by the first routing loop detection device 30 (S232). If identical, the device 40 determines that the routing loop occurs on the path of the investigation target and starts to specify a router that causes the routing loop (S233).

The loop position specifying subroutine (S251 through S263) used to specify a router employs the so-called traceroute method. The second routing loop detection device 40 sequentially transmits investigating packets with echo request messages whose residual hop numbers are different to one another (S252 through S256). The device 40 receives a packet with a time-exceeded message as the response and records the IP address of the source node of the received packet (S259). Then, when packets with time-exceeded messages are repeatedly received before receiving a packet with an echo response message and before the residual hop number reaching the maximum value "255", the second routing loop detection device 40 specifies the IP address of the router that causes routing loop from the recorded IP addresses (S262).

If the IP address of the router that causes the routing loop can be specified by the traceroute method (S258; YES), the second routing loop detection device 40 outputs that the router that causes the routing loop can be specified (S262, S263, S205; YES, S207).

According to the operations, the second routing loop detection device 40 has the following effects.

According to the conventional method (the above-described third method), it was necessary to check whether the contents are identical or not for every target packet. The data amount for a packet required by the check is 13 bytes in IP version 4 and 36 bytes in IP version 6. On the other hand, the second routing loop detection device 40 checks the protocol number field (1 byte) of the IP header and the type field (1 byte) of the ICMP header when the protocol number is "1" even if all the packets are supervised. Further, the device 40 does not execute a heavy process such as a detection of the matching for every combination of every packet. Still further, the second routing loop detection device 40 detects packets with time-exceeded messages only from packets going to the outside of the network N from the gateway router 10' and does not treat all packets flowing into the gateway router 10'. Therefore, when the huge number of packets are input, almost no load is given to the second routing loop detection device 40 during packet capturing. The device 40 can properly execute the process even when a communication speed of the communication line at the downstream of the gateway router 10' is extremely high, that is, even if the device is applied to a large-scale network.

A packet with a time-exceeded message is created when the original packet is discarded. A packet may be discarded by the traceroute and attack, for example, in addition to by the routing loop. That is, if routing loop occurs and a packet is discarded, a packet with a time-exceeded message is transmitted without exception. However, creation of a packet with a time-exceeded message does not necessarily show occurrence of routing loop. Therefore, it can be said that the second routing loop detection device 40 does not overlook the signs of occurrence of routing loop at least by supervising packets with time-exceeded messages.

Thus, the second routing loop detection device 40 transmits an investigating packet to the original destination when it captures a packet with a time-exceeded message. If the packet with the time-exceeded message is returned again, the packet with the time-exceeded message is generated by the routing loop and not by the traceroute or the attack. Therefore, the second routing loop detection device 40 certainly detects whether routing loop occurs in the network N or not by transmitting an investigating packet to the original destination only after capturing a packet with a time-exceeded message.

Further, the second routing loop detection device 40 immediately transmits an investigating packet to the original destination after it captured a packet with a time-exceeded message. The response thereof returns within several seconds. Therefore, the second routing loop detection device 40 can immediately check whether routing loop occurs in the network N or not.

If the second routing loop detection device 40 receives a packet with a time-exceeded message only in response to an investigating packet, the device 40 can check whether routing loop occurs in the network N only. Therefore, the second routing loop detection device 40 starts to specify a router that occurs the routing loop by the traceroute method when the device 40 receives a packet with a time-exceeded message in response to an investigating packet. As a result, the device 40 can specify the position of routing loop that occurs in the network N.

Moreover, if there are no definitions in the filtering table, the second routing loop detection device 40 certainly transmits an investigating packet to the original destination after capturing a packet with a time-exceeded message. On the other hand, if predetermined conditions are registered in the filtering table, an investigating packet will not be transmitted to the destinations that match the conditions. The conditions may be an IP address of a node that does not need investigation, an IP address of a node under a recovering process, a port number that is impossible to be operated at a destination, for example. Since the destinations of the investigating packet are limited by using the filtering table, needless load will not give to the network N and there is no necessity to transmit a packet regarded as an attack.

Still further, the traceroute and the attack generate large-volume packets with time-exceeded messages flowing the path in just front of the gateway router 10' in short term. Further, when one piece of text data is divided into a series of packets and the packets are transmitted to the same destination, these packets may cause the same routing loop. In such a case, there is high possibility that investigation targets determined based on large-volume packets with time-exceeded messages generated in short term are almost identical. Therefore, it is not necessary to transmit investigating packets for all the packets with the time-exceeded messages. Thus, the second routing loop detection device 40 registers the network address of the subnet including the destination IP address to which the investigating packet have been transmitted to the waiting target management table. An investigating packet is not transmitted to the subnet that has been investigated during a constant period. With this method, the number of investigations is extensively reduced, which lightens a load to the network N.

Yet further, the partially completed packet is stored in the HDD 40d of the second routing loop detection device 40 in advance. Therefore, an investigating packet can be immediately created by reading a partially completed packet from the HDD 40d and changing parts of the partially completed packet after capturing the packet with the time-exceeded message. With this method, it is unnecessary to newly create an investigating packet, which prevents the reduction of the processing speed.

Moreover, a flow of an investigation packet may be limited in view of the security at the destination or a node on the path to the destination in response to data (layer 4 header or layer 3 header) other than an IP header (so called packet filtering). In such a case, even if an investigating packet is transmitted, it is discarded on the path and a proper response will not return. The second routing loop detection device 40 reads a protocol number, a port number in addition to an IP address of an original destination from a packet with a time-exceeded message that flows into the gateway router 10'. Then the device 40 adds data (layer 4 header or layer 3 header) corresponding to the protocol number and the port number into the IP header, thereby creates a packet required by a communication service (for example, echo, daytime, telnet, FTP (File Transfer Protocol), ssh (Secure Shell), http (HyperText Transfer Protocol), POP (Post Office Protocol), SMTP (Simple Mail Transfer Protocol), DNS (Domain Name Server)) operated at the destination. Even if a port of the original destination will not open for receiving an investigating packet, the investigating packet can avoid flow prohibition by the packet filtering. As a result, it is unnecessary to temporally lower the security level of the destination.

In the above-described embodiment, the data added to the IP header in an investigating packet is data corresponding to a protocol number and a port number (layer 4 header or layer 3 header). However, the additional data is not limited by the embodiment. The following modification adds an echo request message as data added to the IP header of an investigating packet.

Modification of the Embodiment

Figure 15:
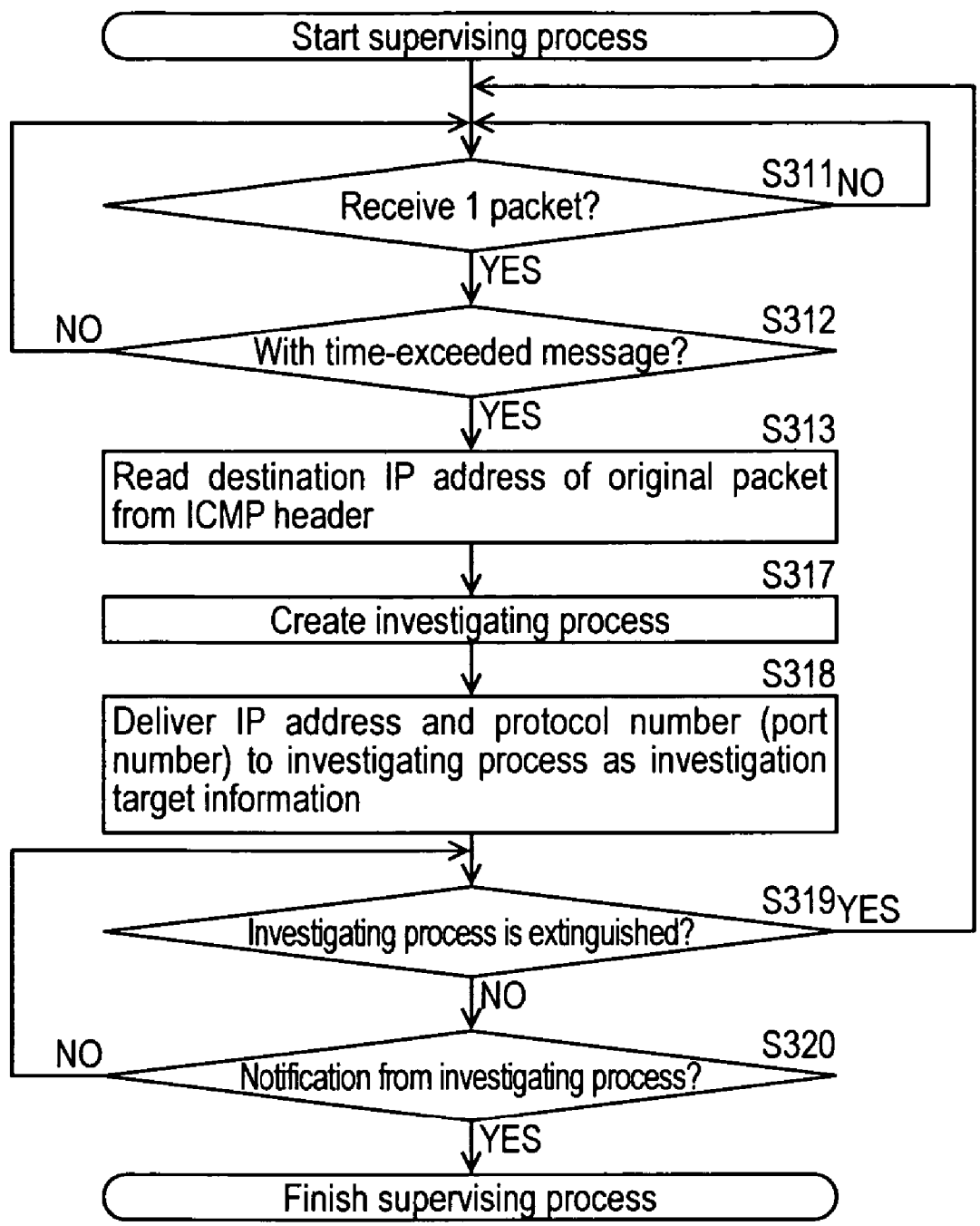
FIG. 15 is a flowchart for explaining a supervising process in a modification of the embodiment.

FIG. 15 is a flowchart for explaining a supervising process of the modification of the embodiment. As it becomes clear by comparing FIG. 15 with FIG. 11, the supervising process of the modification omits steps S214 through S216 of FIG. 11.

When the supervising process 41a receives a packet with a time-exceeded message (S312), the process 41a reads a destination IP address of the original packet that caused the packet received at step S311 from the ICMP option field of the ICMP header (S313) and starts to create an investigating process (S317).

Therefore, the investigation target information, which is delivered from the supervising process 41a to the investigating process 41b, includes an IP address of the original destination only.

On the other hand, the investigating process 41b in the modification reads a partially completed packet including the echo request message from the HDD 40d (S227) when the investigation target does not need waiting (S225; YES). That is, the partially completed packet in the modification includes the IP header whose residual hop number is "255" (the maximum value) and the ICMP header whose type field is "8". The investigating process 41b reads the partially completed packet from the HDD 40d, and then, changes certain fields (S228) to create an investigating packet. The process 41b transmits the investigating packet to the destination of the investigation target (S229) and waits a response (S230).

At the time, the packet received in response to the investigating packet has an echo response message or a time-exceeded message. If routing loop occurs, the packet received in response to the investigating packet has a time-exceeded message that is the same as the previous embodiment. Therefore, the second routing loop detection device 40 of the modification has the same effects as the previous embodiment. After reading, the supervising process 41a goes to step S214.

What is claimed is:

1. A computer readable medium having recorded thereon a routing loop detection program that controls a computer to be operated as equipment comprising:

a extracting portion that extracts packet with a time-exceeded message from all packets captured by a packet capture device connected to a network;

a reading portion that reads destination IP addresses of discarded packets from the time-exceeded messages of the packets extracted by said extracting portion;

a transmitting portion that transmits an investigating packet to the destination IP address read by said reading portion through a communication device connected to said network;

a receiving portion that receives a packet in response to the investigating packet transmitted by said transmitting portion through said communication device; and an output portion that notifies occurrence of routing loop when the packet received by said receiving portion has a time-exceeded message.

2. The computer readable medium according to claim 1, wherein said investigating packet is a service request packet for a network application service on an application layer.

3. A computer readable medium having recorded thereon a routing loop detection program that controls a computer to be operated as equipment comprising:

a counter that counts the number of packets whose IP header includes a hop number for each of all possible hop numbers when a packet capture device connected to a network acquires all packets captured within a predetermined period;

a discriminator that discriminates whether a flat portion or a sawtooth portion exists in a histogram based on the number of packets for the respective hop numbers counted by said counter; and an output portion that notifies a sign of occurrence of routing loop when said discriminator discriminated that the histogram has the flat portion or the sawtooth portion.

4. A routing loop detection method that is executed by a computer, comprising steps of:

extracting packets with a time-exceeded message from all packets captured by a packet capture device connected to a network;

reading destination IP addresses of discarded packets from the time-exceeded messages of the extracted packets;

transmitting an investigating packet to the destination IP address read at the reading step through a communication device connected to said network;

receiving a packet in response to the investigating packet transmitted through said communication device; and notifying occurrence of routing loop when the packet received has a time-exceeded message.

5. A routing loop detection method that is executed by a computer, comprising steps of:

counting the number of packets whose IP header includes a hop number for each of all possible hop numbers when a packet capture device connected to a network acquires all packets captured within a predetermined period;

discriminating whether a flat portion or a sawtooth portion exists in a histogram based on the number of packets for respective hop numbers counted; and notifying a sign of occurrence of routing loop when it is discriminated that the histogram has the flat portion or the sawtooth portion.

6. A routing loop detection device comprising:

a extracting portion that extracts packets with a time-exceeded message from all packets captured by a packet capture device connected to a network;

a reading portion that reads destination IP addresses of discarded packets from the time-exceeded messages of the packets extracted by said extracting portion;

a transmitting portion that transmits an investigating packet to the destination IP address read by said reading portion through a communication device connected to said network;

a receiving portion that receives a packet in response to the investigating packet transmitted by said transmitting portion through said communication device; and an output portion that notifies occurrence of routing loop when the packet received by said receiving portion has a time-exceeded message.

7. A routing loop detection device comprising:

a counter that counts the number of packets whose IP header includes a hop number for each of all possible hop numbers when a packet capture device connected to a network acquires all packets captured within a predetermined period;

a discriminator that discriminates whether a flat portion or a sawtooth portion exists in a histogram based on the number of packets for the respective hop numbers counted by said counter; and an output portion that notifies a sign of occurrence of routing loop when said discriminator discriminated that the histogram has the flat portion or the sawtooth portion.

8. A computer readable medium that stores a routing loop detection program that controls a computer to be operated as equipment including:

a extracting portion that extracts packets with a time-exceeded message from all packets captured by a packet capture device connected to a network;

a reading portion that reads destination IP addresses of discarded packets from the time-exceeded messages of the packets extracted by said extracting portion;

a transmitting portion that transmits an investigating packets to the destination IP address read by said reading portion through a communication device connected to said network;

a receiving portion that receives a packet in response to the investigating packet transmitted by said transmitting portion through said communication device; and an output portion that notifies occurrence of routing loop when the packet received by said receiving portion has a time-exceeded message.

9. A computer readable medium that stores a routing loop detection program that controls a computer to be operated as equipment comprising:

a counter that counts the number of packets whose IP header includes a hop number for each of all possible hop numbers when a packet capture device connected to a network acquires all packets captured within a predetermined period;

a discriminator that discriminates whether a flat portion or a sawtooth portion exists in a histogram based on the number of packets for the respective hop numbers counted by said counter; and an output portion that notifies a sign of occurrence of routing loop when said discriminator discriminated that the histogram has the flat portion or the sawtooth portion.

10. A routing loop detection method that is executed in a network including at least two routers and a packet capture device on every path connecting adjacent routers, comprising steps of:

for a first computer, counting the number of packets whose IP header includes a hop number for each of all possible hop numbers when said packet capture device acquires all packets captured within a predetermined period;

discriminating whether a flat portion or a sawtooth portion exists in a histogram based on the number of packets for respective hop numbers counted;

notifying the IP address of the router corresponding to the packet capture device to a second computer when it is discriminated that the histogram has the flat portion or the sawtooth portion;

for a second computer that receives the notification, extracting the packets with a time-exceeded message from all packets captured by the packet capture device located just behind a gateway router at the most upstream of the network, when a packet that flows from said gateway router to the outside of the network;

reading destination IP addresses of discarded packets from the time-exceeded messages of the extracted packets;

transmitting an investigating packet to the destination IP address read at the reading step through a communication device connected to said network;

receiving a packet in response to the investigating packet transmitted through said communication device;

discriminating whether the source IP address of the received packet is coincident with the IP address notified from said first computer when the received packet has a time-exceeded message;

notifying occurrence of routing loop when the source IP address of the received packet is coincident with the IP address notified from said first computer.

\* \* \* \* \*

UNITED STATES PATENT AND TRADEMARK OFFICE
CERTIFICATE OF CORRECTION

PATENT NO. : 7,379,426 B2
APPLICATION NO. : 10/785032
DATED : May 27, 2008
INVENTOR(S) : Atsuji Sekiguchi It is certified that error appears in the above-identified patent and that said Letters Patent is hereby corrected as shown below:

Column 23, Line 65, after "extracts" insert --a--.

Signed and Sealed this

Twenty-first Day of October, 2008

JON W. DUDAS
*Director of the United States Patent and Trademark Office*